United States Patent
Bae et al.

(10) Patent No.: US 11,611,383 B2
(45) Date of Patent: *Mar. 21, 2023

(54) METHOD FOR TRANSMITTING AND RECEIVING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Duckhyun Bae, Seoul (KR); Jiwon Kang, Seoul (KR); Yunjung Yi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,142

(22) Filed: Sep. 8, 2021

(65) Prior Publication Data

US 2022/0006503 A1     Jan. 6, 2022

Related U.S. Application Data

(63) Continuation of application No. 16/875,014, filed on May 15, 2020, now Pat. No. 11,121,756, which is a
(Continued)

(51) Int. Cl.
*H04B 7/06* (2006.01)
*H04W 76/11* (2018.01)
(Continued)

(52) U.S. Cl.
CPC ......... *H04B 7/0626* (2013.01); *H04L 5/0092* (2013.01); *H04L 5/0098* (2013.01);
(Continued)

(58) Field of Classification Search
CPC .. H04B 7/0621; H04B 7/0626; H04B 7/0632; H04W 72/04; H04W 72/042;
(Continued)

(56) References Cited

U.S. PATENT DOCUMENTS

2013/0021926 A1   1/2013  Geierhofer et al.
2019/0081679 A1   3/2019  Davydov et al.
(Continued)

FOREIGN PATENT DOCUMENTS

| CN | 106537821 | 3/2017 |
|---|---|---|
| CN | 107210857 | 9/2017 |
| CN | 110545562 | 12/2019 |

OTHER PUBLICATIONS

3rd Generation Partnership Project; Technical Specification Group Radio Access Network, "NR; Physical layer procedures for data (Release 15)", 3GPP TS 38.214 V1.0.1, Sep. 2017, 38 pages.
(Continued)

*Primary Examiner* — Peter Chen
(74) *Attorney, Agent, or Firm* — Fish & Richardson P.C.

(57) ABSTRACT

Disclosed are a method for transmitting and receiving a radio signal in a wireless communication system and an apparatus therefor. Particularly, a method for performing, by a terminal, channel state information (CSI) reporting in a wireless communication system comprises the steps of: receiving, from a base station, bandwidth part (BWP) configuration information on a BWP for uplink and/or downlink transmission; receiving, from the base station, reporting configuration information including a reporting configuration for the CSI reporting; and performing the CSI reporting on the basis of the BWP configuration information and the reporting configuration information, wherein the reporting configuration is associated with the BWP, and whether or not
(Continued)

the reporting configuration is activated may be determined on the basis of whether or not the BWP is activated.

15 Claims, 16 Drawing Sheets

Related U.S. Application Data continuation of application No. PCT/KR2018/014122, filed on Nov. 16, 2018.

(60) Provisional application No. 62/619,636, filed on Jan. 19, 2018, provisional application No. 62/588,155, filed on Nov. 17, 2017, provisional application No. 62/587,427, filed on Nov. 16, 2017.

(51) Int. Cl.
  *H04L 5/00* (2006.01)
  *H04W 24/10* (2009.01)
  *H04W 72/12* (2009.01)
  *H04W 72/50* (2023.01)

(52) U.S. Cl.
  CPC ......... *H04W 24/10* (2013.01); *H04W 72/535* (2023.01); *H04W 76/11* (2018.02)

(58) Field of Classification Search
  CPC ......... H04W 72/0406; H04W 72/0446; H04W 72/0413; H04W 72/0453; H04W 72/1205; H04W 72/1257; H04W 72/1278; H04W 72/1289; H04W 24/10; H04W 76/10; H04W 76/11; H04L 5/0091; H04L 5/0092; H04L 5/0094; H04L 5/0096; H04L 5/0098
  See application file for complete search history.

(56) References Cited

U.S. PATENT DOCUMENTS

| 2019/0141546 | A1 | 5/2019 | Zhou et al. |
| 2019/0141677 | A1 | 5/2019 | Harrison et al. |
| 2019/0149305 | A1 | 5/2019 | Zhou et al. |
| 2019/0150183 | A1 | 5/2019 | Aiba et al. |
| 2019/0364546 | A1 | 11/2019 | Kwak et al. |

OTHER PUBLICATIONS

3rd Generation Partnership Project; Technical Specification Group Radio Access Network, "NR; Physical layer procedures for data (Release 15)," 3GPP TS 38.214, V1.0.1, dated Sep. 2017, 35 pages.

EP Extended European Search Report in European Appln. No. 18879613.0, dated Nov. 16, 2020, 9 pages.
Ericsson, "Partial band CSI reporting", R1-1716360, 3GPP TSG-RAN WG1 NR Ad Hoc #3, Nagoya, Japan, Sep. 18-21, 2017, 5 pages.
Ericsson, "Summary of views on CSI reporting," R1-1718956, 3GPP TSG-RAN WG1 #90bis, Prague, Czech Republic, dated Oct. 9-13, 2017, 8 pages.
Ericsson, "Summary of views on CSI reporting," R1-1721451, 3GPP TSG-RAN WG1 #91, Reno, USA, dated Nov. 27-Dec. 1, 2017, 11 pages.
Huawei, HiSilicon, "On initial active bandwidth part," R1-1717057, 3GPP TSG RAN WG1 Meeting 90bis, Prague, Czech Republic, dated Oct. 9-13, 2017, 4 pages.
Huawei, HiSilicon, "Overview of bandwidth part," R1-1712153, 3GPP TSG RAN WG1 Meeting #90, Prague, Czech Republic, dated Aug. 21-25, 2017, 8 pages.
InterDigital, Inc., "Remaining details of BWP", R1-1718365, 3GPP TSG RAN WG1 #90bis, Prague, CZ, Oct. 9-13, 2017, 6 pages.
KR Notice of Allowance in Korean Appln. No. 10-2018-0141926, dated Apr. 3, 2019, 4 pages (with English translation).
LG Electronics, "Discussion on CSI measurement," R1-1717939, 3GPP TSG RAN WG1 Meeting 90bis, Prague, CZ, dated Oct. 9-13, 2017, 8 pages.
InterDigital, Inc., "CO RESET Monitoring Under Dynamic Change of BWP," R1-1714111, 3GPP TSG RAN WG1 Meeting #90, Prague, Czech Republic, dated Aug. 21-25, 2017, 5 pages.
MediaTek Inc., "Remaining Details on Bandwidth Part Operation in NR," R1-1718327, 3GPP TSG RAN WG1 Meeting 90bis, Prague, CZ, dated Oct. 9-13, 2017, 13 pages.
MediaTek Inc., "Summary of Bandwidth Part Operation", R1-1718839, 3GPP TSG RAN WG1 Meeting 90bis, Prague, CZ, Oct. 9-13, 2017, 13 pages.
NEC, "Remaining details of the Bandwidth parts," R1-1714052, 3GPP TSG-RAN WG1 Meeting #90, Prague, Czech Republic, dated Aug. 21-25, 2017, 3 pages.
JP Office Action in Japanese Appln. No. 2020-526984, dated Jul. 27, 2021, 4 pages (with English translation).
MediaTek Inc., "Further Details on Bandwidth Part Operation in NR Document for: Discussion," R1-17013978, 3GPP TSG RAN WG1 Meeting #90, Prague, Czech Republic, Aug. 21-25, 2017, 10 pages.
Decision to Grant a Patent in Japanese Appln. No. 2020-526984, dated Oct. 18, 2022, 4 pages (with English translation).
LG Electronics, "Discussion on CSI measurement," R1-1717939, Presented at 3GPP TSG RAN WG1 Meeting 90bis, Prague, Czech Republic, Oct. 9-13, 2017, 8 pages.
Office Action in Chinese Appln. No. 201880086566.7, dated Oct. 31, 2022, 13 pages (with English translation).

METHOD FOR TRANSMITTING AND RECEIVING CHANNEL STATE INFORMATION IN WIRELESS COMMUNICATION SYSTEM AND APPARATUS THEREFOR

CROSS-REFERENCE TO RELATED APPLICATIONS

This application is a continuation of U.S. application Ser. No. 16/875,014, filed on May 15, 2020 which is a continuation of International Application PCT/KR2018/014122, filed on Nov. 16, 2018, which claims the benefit of U.S. Provisional Patent Application Nos. 62/619,636, filed on Jan. 19, 2018, 62/588,155, filed on Nov. 17, 2017, and 62/587,427, filed on Nov. 16, 2017, the contents of which are hereby incorporated by reference herein in their entirety.

TECHNICAL FIELD

The disclosure relates to a wireless communication system, and more specifically, to a method for communicating channel state information and apparatus for supporting the same.

BACKGROUND

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY

The disclosure proposes a method for communicating channel state information (CSI) in a wireless communication system.

Specifically, the disclosure proposes a method of setting a semi-persistent CSI configuration. The disclosure also proposes a method of identifying downlink control information for the semi-persistent CSI configuration. The disclosure also proposes a method of setting activation/deactivation between the semi-persistent CSI configuration and bandwidth part (BWP). The disclosure also proposes a method of identifying the CSI configuration related to a time division duplexing (TDD) configuration and/or slot format. The disclosure also proposes a method of processing the validity of the CSI configuration.

It is to be understood that technical objects to be achieved by the present disclosure are not limited to the aforementioned technical object and other technical objects which are not mentioned herein will be apparent from the following description to one of ordinary skill in the art to which the present disclosure pertains.

According to an embodiment of the disclosure, a method of performing channel state information (CSI) reporting by a user equipment (UE) in a wireless communication system comprises receiving bandwidth part (BWP) configuration information for a BWP for uplink and/or downlink transmission from a base station, receiving reporting configuration information including a reporting configuration for the CSI reporting from the base station, and performing the CSI reporting based on the BWP configuration information and the reporting configuration information. The reporting configuration may be associated with the BWP. The reporting configuration is activated may be determined based on whether the BWP is activated.

Further, according to an embodiment of the disclosure, in the method performed by the UE, the CSI reporting may be semi-persistently configured CSI reporting.

Further, according to an embodiment of the disclosure, in the method performed by the UE, the CSI reporting may be performed via a physical uplink shared channel.

Further, according to an embodiment of the disclosure, in the method performed by the UE, when the BWP is deactivated, the reporting configuration may be deactivated.

Further, according to an embodiment of the disclosure, in the method performed by the UE, whether the BWP is activated may be set via dynamic signaling by the base station.

Further, according to an embodiment of the disclosure, in the method performed by the UE, the reporting configuration may include resource configuration information related to the CSI reporting. The resource configuration information may include information for the BWP.

According to an embodiment of the disclosure, a method of receiving channel state information (CSI) by a base station in a wireless communication system comprises transmitting bandwidth part (BWP) configuration information for a BWP for uplink and/or downlink transmission to a user equipment (UE), transmitting reporting configuration information including a reporting configuration for the CSI reporting to the UE, and receiving the CSI reporting based on the BWP configuration information and the reporting configuration information from the UE. The reporting configuration may be associated with the BWP. Whether the reporting configuration is activated may be determined based on whether the BWP is activated.

Further, according to an embodiment of the disclosure, in the method performed by the base station, the CSI reporting may be semi-persistently configured CSI reporting.

Further, according to an embodiment of the disclosure, in the method performed by the base station, the CSI reporting may be performed via a physical uplink shared channel.

Further, according to an embodiment of the disclosure, in the method performed by the base station, when the BWP is deactivated, the reporting configuration may be deactivated.

Further, according to an embodiment of the disclosure, in the method performed by the base station, whether the BWP is activated may be set via dynamic signaling by the base station.

Further, according to an embodiment of the disclosure, in the method performed by the base station, the reporting configuration may include resource configuration information related to the CSI reporting. The resource configuration information may include information for the BWP.

According to an embodiment of the disclosure, a user equipment (UE) performing channel state information (CSI)

reporting in a wireless communication system comprises a radio frequency (RF) unit for transmitting/receiving a radio signal and a processor functionally connected with the RF unit. The processor may perform control to receive bandwidth part (BWP) configuration information for a BWP for uplink and/or downlink transmission from a base station, receive reporting configuration information including a reporting configuration for the CSI reporting from the base station, and perform the CSI reporting based on the BWP configuration information and the reporting configuration information. The reporting configuration may be associated with the BWP. Whether the reporting configuration is activated may be determined based on whether the BWP is activated.

Further, according to an embodiment of the disclosure, in the UE, the CSI reporting may be semi-persistently configured CSI reporting.

Further, according to an embodiment of the disclosure, in the UE, the CSI reporting may be performed via a physical uplink shared channel.

According to an embodiment of the disclosure, it is possible to allocate an effective uplink resource (e.g., PUSCH and PUCCH resources) to allow the terminal to semi-persistently report (i.e., transmit) the CSI.

Further, according to an embodiment of the disclosure, it is possible to distinguish downlink control information (DCI) used for allocating uplink resources (e.g., PUSCH and PUCCH resources) for CSI transmission from other DCI without increasing the UE's blind decoding.

It will be appreciated by those skilled in the art that the effects that can be achieved with the present disclosure are not limited to what has been described above and other advantages of the present disclosure will be clearly understood from the following detailed description taken in conjunction with the accompanying drawings.

DESCRIPTION OF DRAWINGS

The accompanying drawings, which are included herein as a part of a description in order to help understanding of the present disclosure, provide embodiments of the present disclosure, and describe the technical features of the present disclosure with the description below.

DETAILED DESCRIPTION

Figure 1:
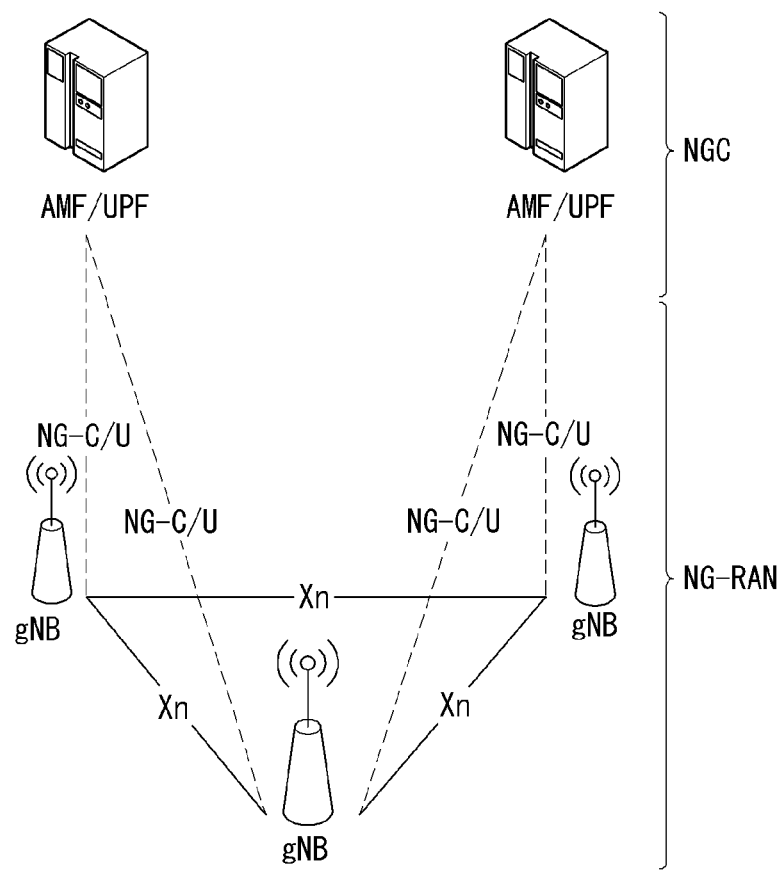
FIG. 1 illustrates an example of an overall structure of a new radio (NR) system to which a method proposed by the present disclosure may be implemented.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/New RAT (NR) is chiefly described, but the technical characteristics of the present disclosure are not limited thereto.

As propagation of smart phones and Internet of things (IoT) terminals rapidly spreads, the amount of information which is transmitted and received through a communication network increases. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this specification, for easy description, the next-generation wireless access technology is referred to as a new radio access technology (RAT) (NR) radio access technology and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480\cdot10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
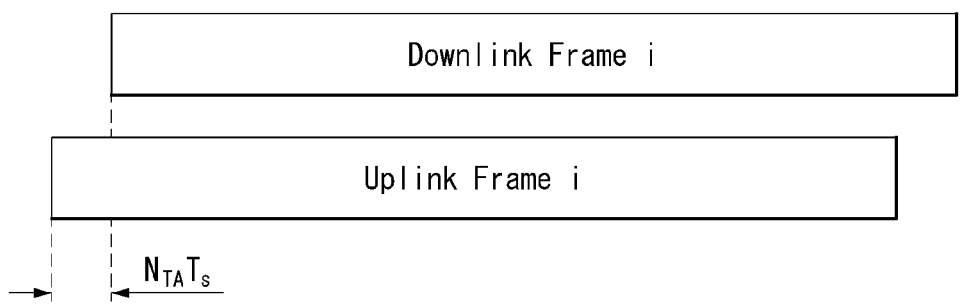
FIG. 2 illustrates a relationship between a uplink (UL) frame and a downlink (DL) frame in a wireless communication system to which a method proposed by the present disclosure may be implemented.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number ($N_{symb}^{slot}$) of OFDM symbols per slot, the number ($N_{slot}^{frame,\mu}$) of slots per radio frame, and the number ($N_{slot}^{subframe,\mu}$) of slots per subframe in normal CP, and Table 3 shows the number of OFDM symbols per slot, the number of slots per radio frame, and the number of slots per subframe in extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 3:
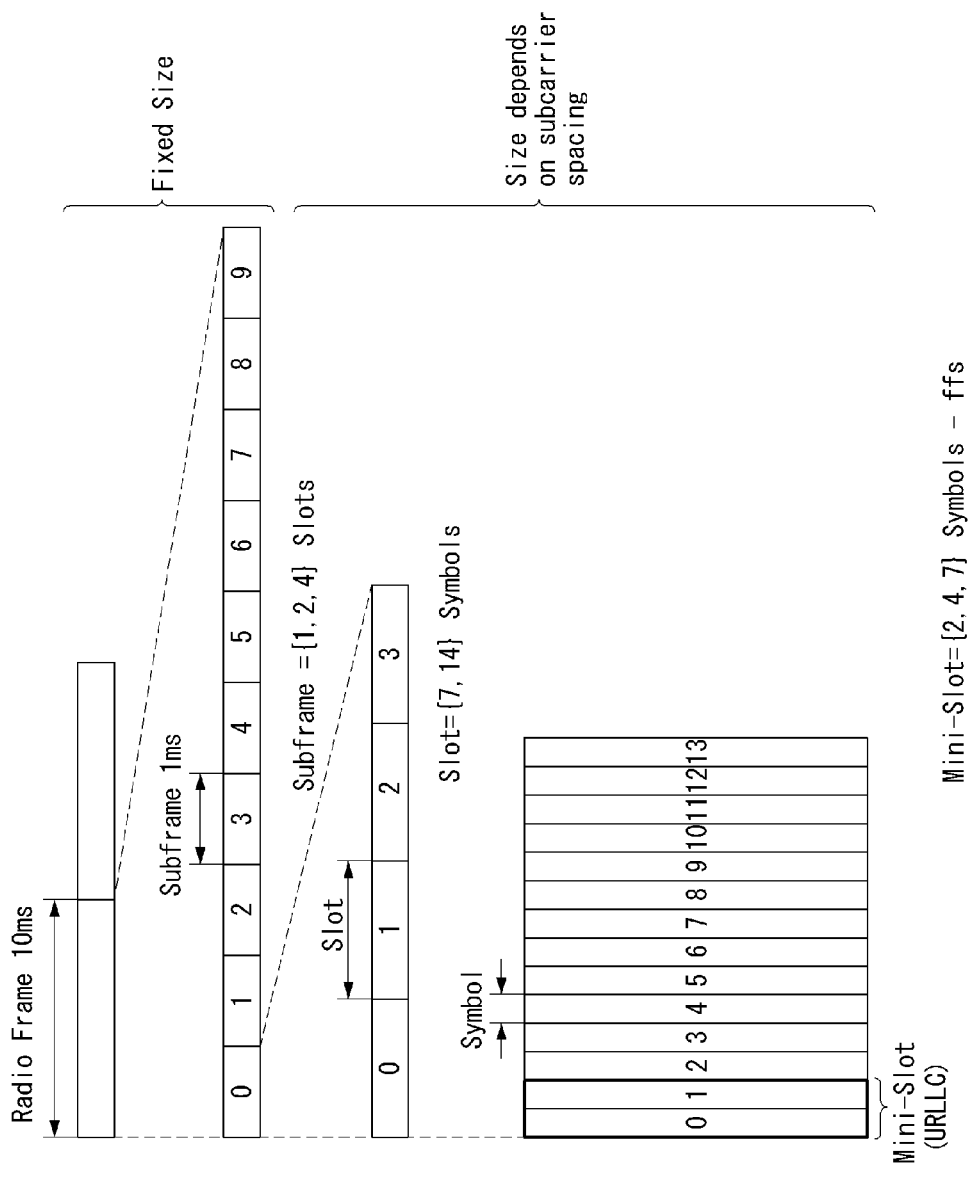
FIG. 3 illustrates an example frame structure in an NR system.

FIG. 3 illustrates an example frame structure in an NR system. FIG. 3 is intended merely for illustration purposes but not for limiting the scope of the disclosure.

Table 3 represents an example where μ=2, i.e., the subcarrier spacing (SCS) is 60 kHz. Referring to Table 2, one subframe (or frame) may include four slots. The "1 subframe={1,2,4} slots" in FIG. 3 is an example, and the number of slots that may be included in one subframe may be defined as shown in Table 2.

The mini-slot may consist of 2, 4, or 7 symbols or more or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Frequency shift, average received power, and Received Timing.

Figure 4:
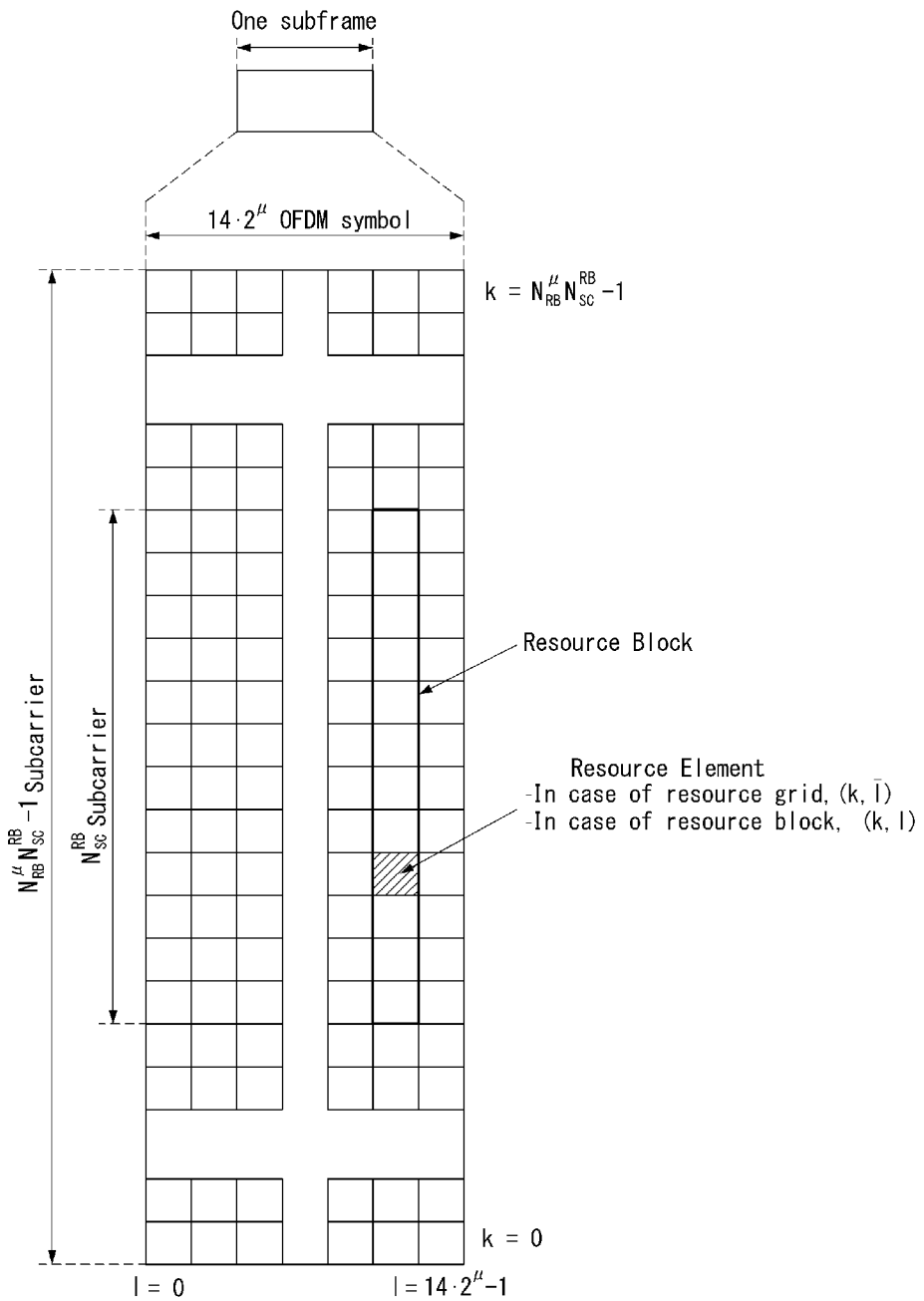
FIG. 4 illustrates an example of a resource grid supported in a wireless communication system to which a method proposed by the present disclosure may be implemented.

FIG. 4 illustrates an example of a resource grid supported in a wireless communication system to which a method proposed by the present disclosure may be implemented.

Referring to FIG. 4, a resource grid is composed of $N_{RB}^\mu N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols Herein, $N_{RB}^\mu \leq N_{RB}^{max,\mu}$. The above $N_{RB}^{max,\mu}$ indicates the maximum transmission bandwidth, and it may change not just between numerologies, but between UL and DL.

Figure 5:
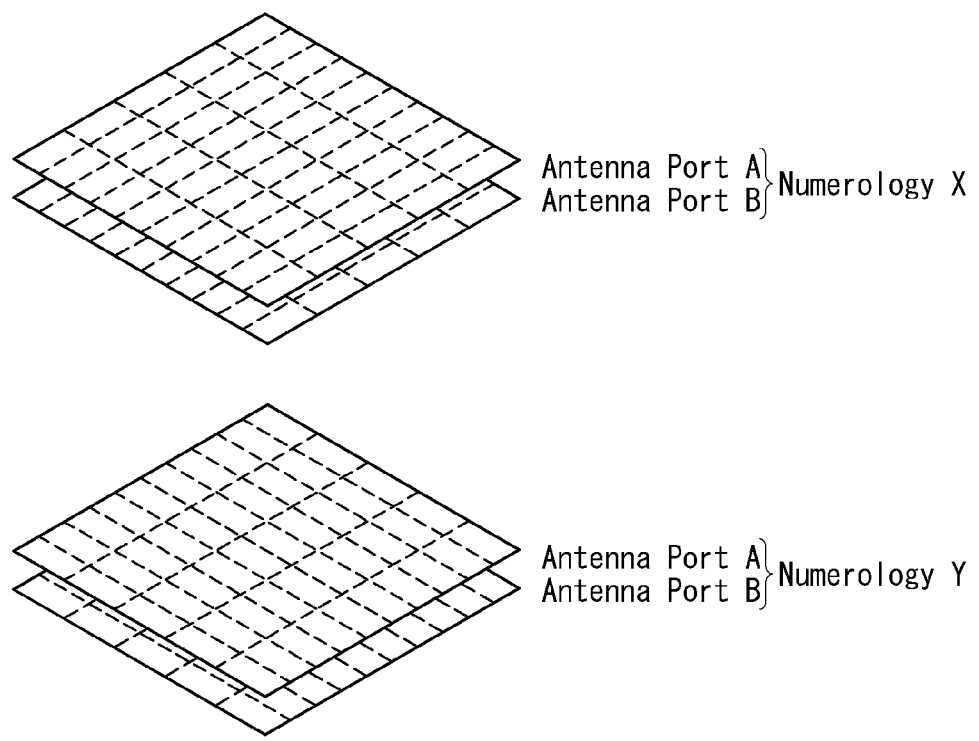
FIG. 5 illustrates examples of resource grids for each antenna port and numerology to which a method proposed in this specification may be applied.

In this case, as illustrated in FIG. 5, one resource grid may be configured for the numerology μ and an antenna port p.

FIG. 5 illustrates examples of resource grids for each antenna port and numerology to which a method proposed in this specification may be applied.

Each element of the resource grid for the numerology μ and the antenna port p is indicated as a resource element, and may be uniquely identified by an index pair (k, l̄). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k, l) is used. Herein $l=0, \ldots, N_{symb}^\mu-1$.

The resource element (k, l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

The physical resource block is defined with $N_{sc}^{RB}=12$ consecutive subcarriers in the frequency domain.

Point A plays a role as a common reference point of the resource block grid and may be obtained as follows.

offsetToPointA for PCell downlink refers to the frequency offset between point A and the lowest subcarrier of the lowest resource block overlapping the SS/PBCH block used by the UE for initial cell selection and is represented with resource block units assuming a subcarrier interval of 15 kHz for FR1 and a subcarrier interval of 60 kHz for FR2;

absoluteFrequencyPointA refers to the frequency-position of point A expressed as in the absolute radio-frequency channel number (ARFCN).

The common resource blocks are numbered up from zero in the frequency domain for subcarrier spacing configuration μ.

The center of subcarrier 0 of common resource block 0 for subcarrier spacing configuration μ matches 'point A.'. In the frequency domain, resource elements (k,l) for common resource block number $n_{CRB}^\mu$ and subcarrier spacing configuration μ may be given as Equation 1 below.

$$n_{CRB}^\mu = \left\lfloor \frac{k}{N_{sc}^{RB}} \right\rfloor \quad \text{Equation 1}$$

Here, k may be defined relative to point A so that k=0 corresponds to the subcarrier with point A centered. The physical resource blocks are numbered from 0 to $N_{BWP,i}^{size}-1$ in the bandwidth part (BWP), and i is the number of the BWP. In BWP i, the relationship between physical resource block $n_{PRB}$ and common resource block $n_{CRB}$ may be given as Equation 2 below.

$$n_{CRB}=n_{PRB}+N_{BWP,i}^{start} \qquad \text{Equation 2}$$

Here, $N_{BWP,i}^{start}$ may be common resource blocks in which the BWP starts relative to common resource block 0.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

Figure 6:
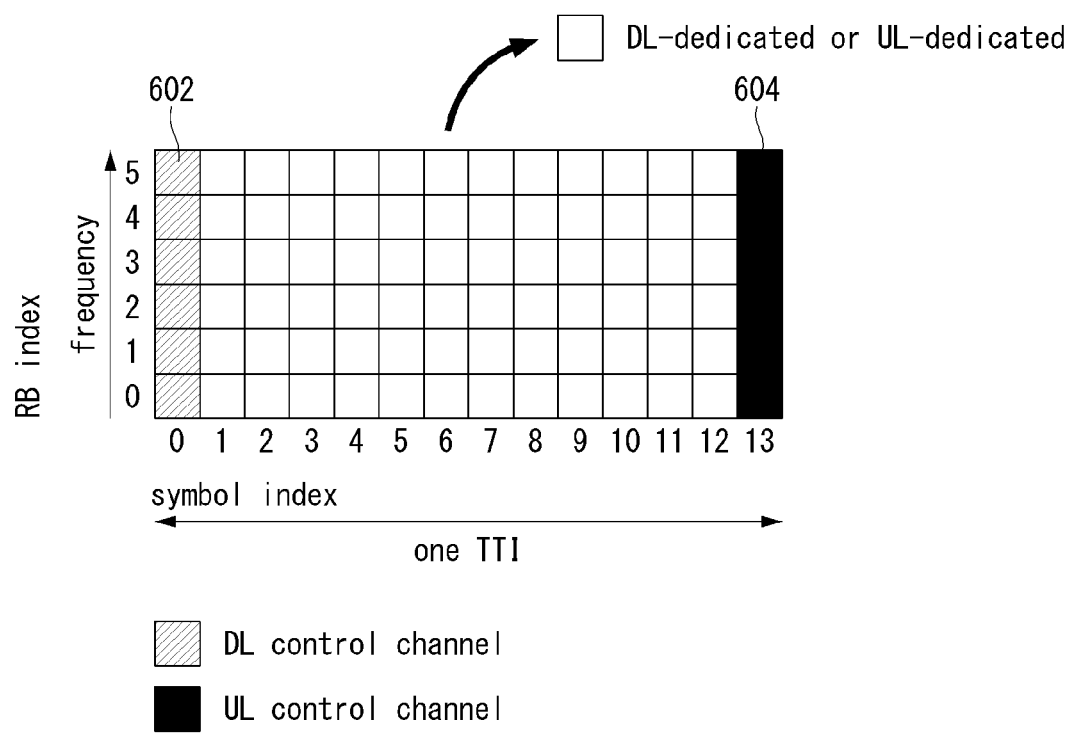
FIG. 6 illustrates an example self-contained structure to which a method proposed herein is applicable.

FIG. 6 illustrates one example of a self-contained structure to which the method proposed in this specification may be applied. FIG. 5 is just for convenience of the description and does not limit the scope of the present disclosure.

Referring to FIG. 6, it is assumed that one transmission unit (e.g., slot or subframe) is constituted by 14 orthogonal frequency division multiplexing (OFDM) symbols as in legacy LTE.

In FIG. 6, a region 602 refers to a downlink control region and a region 604 refers to an uplink control region. Further, a region (that is, a region without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 6, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Analog Beamforming

In a millimeter wave (mmWave, mmW) communication system, as the wavelength of the signal becomes shorter, multiple (or multiplex) antennas may be installed in the same area. For example, in a 30 CHz band, the wavelength is approximately 1 cm, and when antennas are installed at an interval of 0.5 lambda in a panel of 5 cm×5 cm according to a two-dimensional arrangement form, a total of 100 antenna elements may be installed.

Accordingly, in the mmW communication system, a method for increasing coverage or increasing the throughput by increasing a beamforming (BF) gain using multiple antenna elements or increasing a throughput may be considered.

In this case, when a transceiver unit (TXRU) is installed so as to adjust transmission power or a phase for each antenna element, independent beamforming is possible for each frequency resource.

However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered.

The aforementioned analog beamforming method may generate only one beam direction in all bands, so that a frequency selective beam operation may not be performed.

As a result, hybrid beamforming with B TXRUs that are fewer than Q antenna elements, in the form of an intermediate form of digital beamforming and analog beamforming, may be considered. In this case, although there is a difference depending on a connection method of B TXRUs and Q antenna elements, the number of directions of the beams that may be transmitted at the same time is limited to B or less.

Channel State Information (CSI)-Related Procedure

In the new radio (NR) system, a channel state information-reference signal (CSI-RS) is used for time/frequency tracking, CSI computation, layer 1(L1)-reference signal received power (RSRP) computation, or mobility Throughout the present disclosure, "A and/or B" may be interpreted as the same as "including at least one of A or B".

The CSI computation is related to CSI acquisition, and L1-RSRP computation is related to beam management (BM).

The CSI indicates all types of information indicative of a quality of a radio channel (or link) formed between a UE and an antenna port.

Hereinafter, operation of a UE with respect to the CSI-related procedure will be described.

Figure 7:
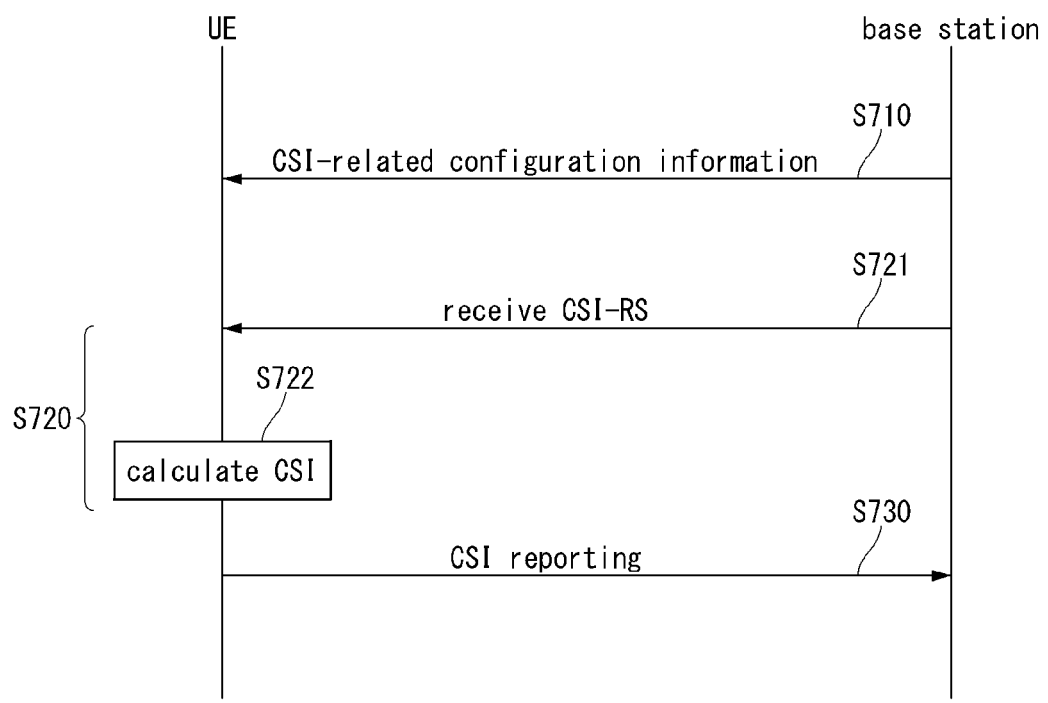
FIG. 7 is a flowchart illustrating an example CSI-related procedure.

FIG. 7 is a flowchart illustrating an example of a CSI-related procedure.

To perform one of the above purposes of a CSI-RS, a terminal (e.g., a UE) receives CSI related configuration information from a base station (e.g., a general node B (gNB)) through a radio resource control (RRC) signaling (S710).

The CSI-related configuration information may include at least one of CSI interference management (IM) resource-related information, CSI measurement configuration-related information, CSI resource configuration-related information, CSI-RS resource-related information, or CSI reporting configuration-related information.

The CSIIM resource-related information may include CSI-IM resource information, CSI-IM resource set information, etc.

The CSI-IM resource set is identified by a CSI-IM resource set ID (identifier), and one resource set includes at least one CSI-IM resource.

Each CSI-IM resource is identified by a CSI-IM resource ID.

The CSI resource configuration-related information defines a group including at least one of a non-zero power (NZP) CSI-RS resource set, a CSI-IM resource set, or a CSI-SSB resource set.

That is, the CSI resource configuration-related information includes a CSI-RS resource set list, and the CSI-RS resource set list may include at least one of a NZP CSI-RS resource set list, a CSI-IM resource set list, or a CSI-SSB resource set list.

The CSI resource configuration-related information may be expressed as CSI-REsourceConfig IE.

The CSI-RS resource set is identified by a CSI-RS resource set ID, and one resource set includes at least one CSI-RS resource.

Each CSI-RS resource is identified by a CSI-RS resource ID.

As shown in Table 4, parameters (e.g.: the BM-related parameter repetition, and the tracking-related parameter trs-Info indicative of (or indicating) a purpose of a CSI-RS may be set for each NZP CSI-RS resource set.

Table 4 shows an example of NZP CSI-RS resource set IE.

TABLE 4

```
-- ASN1START
-- TAG-NZP-CSI-RS-RESOURCESET-START
NZP-CSI-RS-ResourceSet : :=            SEQUENCE {
    nzp-CSI-ResourceSetId              NZP-CSI-RS-ResourceSetId,
    nzp-CSI-RS-Resources               SEQUENCE (SIZE (1..maxNrofNZP-CSI-RS-
ResourcesPerSet) ) OF NZP-CSI-RS-ResourceId,
    repetition                         ENUMERATED { on,
off }                                                           OPTIONAL,
    aperiodicTriggeringOffset          INTEGER(0..4)
                         OPTIONAL, -- Need S
    trs-Info                           ENUMERATED
{true}                                                          OPTIONAL, -- Need R
    ...
}
-- TAG-NZP-CSI-RS-RESOURCESET-STOP
-- ASN1STOP
```

In Table 4, the parameter repetition is a parameter indicative of whether to repeatedly transmit the same beam, and indicates whether repetition is set to "ON" or "OFF" for each NZP CSI-RS resource set.

The term "transmission (Tx) beam" used in the present disclosure may be interpreted as the same as a spatial domain transmission filter, and the term "reception (Rx) beam" used in the present disclosure may be interpreted as the same as a spatial domain reception filter.

For example, when the parameter repetition in Table 4 is set to "OFF", a UE does not assume that a NZP CSI-RS resource(s) in a resource set is transmitted to the same DL spatial domain transmission filter and the same Nrofports in all symbols.

In addition, the parameter repetition corresponding to a higher layer parameter corresponds to "CSI-RS-ResourceRep" of L1 parameter.

The CSI reporting configuration related information includes the parameter reportConfigType indicative of a time domain behavior and the parameter reportQuantity indicative of a CSI-related quantity to be reported.

The time domain behavior may be periodic, aperiodic, or semi-persistent.

In addition, the CSI reporting configuration-related information may be represented as CSI-ReportConfig IE, and Table 5 shows an example of the CSI-ReportConfig IE.

TABLE 5

```
-- ASN1START
-- TAG-CSI-RESOURCECONFIG-START
CSI-ReportConfig ::=         SEQUENCE {
    reportConfigId                     CSI-ReportConfigId,
    carrier                            ServCellIndex
    OPTIONAL, -- Need S
    resourcesForChannelMeasurement     CSI-ResourceConfigId,
    csi-IM-ResourcesForInterference    CSI-ResourceConfigId
    OPTIONAL, -- Need R
    nzp-CSI-RS-ResourcesForInterference  CSI-ResourceConfigId
    OPTIONAL, -- Need R
    reportConfigType                   CHOICE {
        periodic                       SEQUENCE {
            reportSlotConfig                      CSI-
ReportPeriodicityAndOffset,
            pucch-CSI-ResourceList                SEQUENCE (SIZE
(1..maxNrofBWPs)) OF PUCCH-CSI-Resource
        },
        semiPersistentOnPUCCH          SEQUENCE {
            reportSlotConfig                      CSI-
ReportPeriodicityAndOffset,
            pucch-CSI-ResourceList                SEQUENCE (SIZE
(1..maxNrofBWPs) ) OF PUCCH-CSI-Resource
        },
        semiPersistentOnPUSCH          SEQUENCE {
            reportSlotConfig                      ENUMERATED {s15, s110, s120,
s140, s180, s1160, s1320},
            reportSlotOffsetList                  SEQUENCE (SIZE (1.. maxNrofUL-
Allocations) ) OF INTEGER(0..32),
            p0alpha                               P0-PUSCH-AlphaSetId
        },
        aperiodic                      SEQUENCE {
            reportSlotOffsetList                  SEQUENCE (SIZE (1.. maxNrofUL-
Allocations) ) OF INTEGER(0..32)
        }
    },
    reportQuantity                     CHOICE {
        none                           NULL,
        cri-RI-PMI-CQI                 NULL,
        cri-RI-i1                      NULL,
```

TABLE 5-continued

```
    cri-RI-i1-CQI                SEQUENCE {
        pdsch-BundleSizeForCSI           ENUMERATED {n2, n4}
                                         OPTIONAL
    },
    cri-RI-CQI                   NULL,
    cri-RSRP                     NULL,
    ssb-Index-RSRP               NULL,
    cri-RI-LI-PMI-CQI            NULL
},
```

In addition, the UE measures CSI based on configuration information related to the CSI (S720).

Measuring the CSI may include (1) receiving a CSI-RS by the UE (S721) and (2) computing CSI based on the received CSI-RS (S722).

A sequence for the CSI-RS is generated by Equation 3, and an initialization value of a pseudo-random sequence C(i) is defined by Equation 4.

$$r(m) = \frac{1}{\sqrt{2}}(1 - 2 \cdot c(2m)) + j\frac{1}{\sqrt{2}}(1 - 2 \cdot c(2m+1)) \quad \text{Equation 3}$$

$$c_{init} = (2^{10}(N_{symb}^{slot} n_{s,f}^{\mu} + l + 1)(2n_{ID} + 1) + n_{ID}) \bmod 2^{31} \quad \text{Equation 4}$$

In Equations 3 and 4, $n_{s,f}^{\mu}$ is a slot number within a radio frame, and a pseudo-random sequence generator is initialized with Cint at the start of each OFDM symbol where $n_{s,f}^{\mu}$ is the slot number within a radio frame.

In addition, l indicates an OFDM symbol number in a slot, and $n_{ID}$ indicates higher-layer parameter scramblingID.

In addition, regarding the CSI-RS, resource element (RE) mapping of CSI-RS resources of the CSI-RS is performed in time and frequency domains by higher layer parameter CSI-RS-ResourceMapping.

Table 6 shows an example of CSI-RS-ResourceMapping IE.

In Table 6, a density (D) indicates a density of CSI-RS resources measured in a RE/port/physical resource block (PRB), and nrofPorts indicates the number of antenna ports.

In addition, the UE reports the measured CSI to the base station (S730).

Herein, when a quantity of CSI-ReportConfig in Table 6 is set to "none (or No report)", the UE may skip the reporting.

However, even when the quantity is set to "none (or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

To put it briefly, when repetition is set to "ON" and "OFF", a CSI report may indicate any one of "No report", "SSB Resource Indicator (SSBRI) and L1-RSRP", and "CSI-RS Resource Indicator (CRI) and L1-RSRP".

Alternatively, it may be defined to transmit a CSI report indicative of "SSBRI and L1-RSRP" or "CRI and L1-RSRP" when repetition is set to "OFF", it may be defined such that, and to transmit a CSI report indicative of "No report", "SSBRI and L1-RSRP", or "CRI and L1-RSRP" when repetition is "ON".

TABLE 6

```
-- ASN1START
-- TAG-CSI-RS-RESOURCEMAPPING-START
CSI-RS-ResourceMapping ::=         SEQUENCE {
    frequencyDomainAllocation          CHOICE {
        row1                               BIT STRING (SIZE (4) ),
        row2                               BIT STRING (SIZE (12) ),
        row4                               BIT STRING (SIZE (3) ),
        other                              BIT STRING (SIZE (6) )
    },
    nrofPorts                      ENUMERATED {p1,p2,p4,p8,p12,p16,p24,p32},
    firstOFDMSymbolInTimeDomain            INTEGER (0..13),
    firstOFDMSymbolInTimeDomain2   INTEGER
(2..12)                                            OPTIONAL, -- Need
R
    cdm-Type                       ENUMERATED }noCDM, fd-CDM2, cdm4-FD2-TD2,
cdm8-FD2-TD4},
    density                            CHOICE {
        dot5                               ENUMERATED {evenPRBs, oddPRBs},
        one                                NULL,
        three                              NULL,
        spare                              NULL
    },
    freqBand                       CSI-FrequencyOccupation,
    ...
}
```

CSI Measurement and Reporting Procedure

The NR system supports more flexible and dynamic CSI measurement and reporting.

The CSI measurement may include receiving a CSI-RS, and acquiring CSI by computing the received CSI-RS.

As time domain behaviors of CSI measurement and reporting, aperiodic/semi-persistent/periodic channel measurement (CM) and interference measurement (IM) are supported.

To configure CSI-IM, four port NZP CSI-RS RE patterns are used.

CSI-IM-based IMR of NR has a design similar to CSI-IM of LTE and is configured independent of ZP CSI-RS resources for PDSCH rate matching.

In addition, each port in the NZP CSI-RS-based IMR emulates an interference layer having (a desirable channel and) a pre-coded NZP CSI-RS.

This is about intra-cell interference measurement of a multi-user case, and it primarily targets MU interference.

At each port of the configured NZP CSI-RS-based IMR, the base station transmits the pre-coded NZP CSI-RS to the UE.

The UE assumes a channel/interference layer for each port in a resource set, and measures interference.

If there is no PMI or RI feedback for a channel, a plurality of resources are configured in a set and the base station or network indicates, through DCI, a subset of NZP CSI-RS resources for channel/interference measurement.

Resource setting and resource setting configuration will be described in more detail.

Resource Setting

Each CSI resource setting "CSI-ResourceConfig" includes configuration of S≤1 CSI resource set (which is given by higher layer parameter "csi-RS-ResourceSetList").

Herein, a CSI resource setting corresponds to CSI-RS-resourcesetlist.

Herein, S represents the number of configured CSI-RS resource sets.

Herein, configuration of S≤1 CSI resource set includes each CSI resource set including CSI-RS resources (composed of NZP CSI-RS or CSI-IM), and a SS/PBCH block (SSB) resource used for L1-RSRP computation.

Each CSI resource setting is positioned at a DL bandwidth part (BWP) identified by higher layer parameter bwp-id.

In addition, all CSI resource settings linked to a CSI reporting setting have the same DL BWP.

In a CSI resource setting included in CSI-ResourceConfig IE, a time domain behavior of a CSI-RS resource may be indicated by higher layer parameter resourceType and may be configured to be aperiodic, periodic, or semi-persistent.

The number S of CSI-RS resource sets configured for periodic and semi-persistent CSI resource settings is restricted to "1".

A periodicity and a slot offset configured for periodic and semi-persistent CSI resource settings are given from a numerology of related DL BWP, just like being given by bwp-id.

When the UE is configured with a plurality of CSI-ResourceConfig including the same NZP CSI-RS resource ID, the same time domain behavior is configured for the CSI-ResourceConfig.

When the UE is configured with a plurality of CSI-ResourceConfig having the same CSI-IM resource ID, the same time domain behavior is configured for the CSI-ResourceConfig.

Then, one or more CSI resource settings for channel measurement (CM) and interference measurement (IM) are configured through higher layer signaling.

A CSI-IM resource for interference measurement.
An NZP CSI-RS resource for interference measurement.
An NZP CSI-RS resource for channel measurement.

That is, a channel measurement resource (CMR) may be an NZP CSI-RS for CSI acquisition, and an interference measurement resource (IMR) may be an NZP CSI-RS for CSI-IM and for IM.

Herein, CSI-IM (or a ZP CSI-RS for IM) is primarily used for inter-cell interference measurement.

In addition, an NZP CSI-RS for IM is primarily used for intra-cell interference measurement from multi-user.

The UE may assume that a CSI-RS resource(s) and a CSI-IM/NZP CSI-RS resource(s) for interference measurement configured for one CSI reporting is "QCL-TypeD" for each resource.

Resource Setting Configuration

As described above, a resource setting may represent a resource set list.

Regarding aperiodic CSI, each trigger state configured using higher layer parameter "CSI-AperiodicTriggerState" is that each CSI-ReportConfig is associated with one or multiple CSI-ReportConfig linked to a periodic, semi-persistent, or aperiodic resource setting.

One reporting setting may be connected to three resource settings at maximum.

When one resource setting is configured, a resource setting (given by higher layer parameter resourcesForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForinterference or nzp-CSI-RS-ResourcesForinterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForinterference) is for CSI-IM based interference measurement, and the third resource setting (given by nzp-CSI-RS-ResourcesForinterference) is for NZP CSI-RS based interference measurement.

Regarding semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, the first resource setting (given by resourcesForChannelMeasurement) is for channel measurement, and the second resource setting (given by the higher layer parameter "csi-IM-ResourcesForinterference") is used for interference measurement performed on CSI-IM.

CSI computation regarding CSI measurement will be described in more detail.

If interference measurement is performed on CSI-IM, each CSI-RS resource for channel measurement is associated with a CSI-RS resource in a corresponding resource set by an order of CSI-RS resources and CSI-IM resources.

The number of CSI-RS resources for channel measurement is the same as the number of CSI-IM resources.

In addition, when interference measurement is performed on an NZP CSI-RS, the UE is not expected to be configured with one or more NZP CSI-RS resources in an associated resource set within a resource setting for channel measurement.

A UE configured with higher layer parameter nzp-CSI-RS-ResourcesForinterference is not expected to be configured with 18 or more NZP CSI-RS ports in a NZP CSI-RS resource set.

For CSI measurement, the UE assumes the following.

Each NZP CSI-RS port configured for interference measurement corresponds to an interference transmission layer.

Every interference transmission layer of NZP CSI-RS ports for interference measurement considers an energy per resource element (EPRE) ratio.

A different interference signal on a RE(s) of an NZP CSI-RS resource for channel measurement, an NZP CSI-RS resource for interference measurement, or a CSI-IM resource for interference measurement.

A CSI reporting procedure will be described in more detail.

For CSI reporting, time and frequency resources available for an UE are controlled by a base station.

CSI may include at least one of channel quality indicator (CQI), a precoding matrix indicator (PMI), a CSI-RS resource indicator (CRI), am SS/PBCH block resource indicator (SSBRI), a layer indicator (LI), a rank indicator (RI), or L1-RSRP.

Regarding the CQI, the PMI, the CRI, the SSBRI, the LI, the RI, and the L1-RSRP, the UE may be configured with N≤1 CSI-ReportConfig reporting setting, M≤1 CSI-ResourceConfig resource setting, and a list of one or two trigger states (provided by aperiodicTriggerStateList and semiPersistentOnPUSCH-TriggerStateList) by a higher layer.

In the aperiodicTriggerStateList, each trigger state includes a channel and a list of associated CSI-ReportConfigs selectively indicative of Resource set IDs for interference.

In the semiPersistentOnPUSCH-TriggerStateList, each trigger state includes one associated CSI-ReportConfig.

In addition, a time domain behavior of CSI reporting supports periodic, semi-persistent, and aperiodic CSI reporting.

Hereinafter, periodic, semi-persistent, and aperiodic CSI reporting will be described.

The periodic CSI presorting is performed on a short PUCCH and a long PUCCH.

A periodicity and a slot offset of the periodic CSI reporting may be configured by RRC and refer to CSI-ReportConfig IE.

Then, SP CSI reporting is performed on a short PUCCH, a long PUCCH, or a PUSCH.

In the case of SP CSI on a short/long PUCCH, a periodicity and a slot offset are configured by RRC, and CSI reporting to an additional MAC CE is activated/deactivated In the case of SP CSI on a PUSCH, a periodicity of SP CSI reporting is configured by RRC, but a slot offset thereof is not configured by RRC and SP CSI reporting is activated/deactivated by DCI (format 0_1).

The first CSI reporting timing follows a PUSCH time domain allocation value indicated by DCI, and subsequent CSI reporting timing follows a periodicity which is configured by RRC.

For SP CSI reporting on a PUSCH, a separated RNTI (SP-CSI C-RNTI) is used.

DCI format 0_1 may include a CSI request field and activate/deactivate a specific configured SP-CSI trigger state.

In addition, SP CSI reporting is activated/deactivated identically or similarly to a mechanism having data transmission on a SPS PUSCH.

Next, aperiodic CSI reporting is performed on a PUSCH and triggered by DCI.

In the case of AP CSI having an AP CSI-RS, an AP CSI-RS timing is configured by RRC.

Herein, a timing of AP CSI reporting is dynamically controlled by DCI.

A reporting method (e.g., transmitting in order of RI, WB, PMI/CQI, and SB PMI/CQI) by which CSI is divided and reported in a plurality of reporting instances, the method which is applied for PUCCH-based CSI reporting in LTE, is not applied in NR.

Instead, NR restricts configuring specific CSI reporting on a short/long PUCCH, and a CSI omission rule is defined.

Regarding an AP CSI reporting timing, PUSCH symbol/slot location is dynamically indicated by DCI. In addition, candidate slot offsets are configured by RRC.

Regarding CSI reporting, a slot offset(Y) is configured for each reporting setting.

Regarding UL-SCH, a slot offset K2 is configured separately.

Two CSI latency classes (low latency class and high latency class) are defined in terms of CSI computation complexity.

The low latency CSI is WB CSI that includes up to 4-ports Type-I codebook or up to 4-ports non-PMI feedback CSI.

The high latency CSI is a CSI other than the low latency CSI.

Regarding a normal UE, (Z, Z') is defined in a unit of OFDM symbols.

Z represents the minimum CSI processing time after receiving CSI triggering DCI and before performing CSI reporting.

Z' represents the minimum CSI processing time after receiving CSI-RS about a channel/interference and before performing CSI reporting Additionally, the UE reports the number of CSI which can be calculated at the same time.

CSI Reporting Using PUSCH

Figure 8:
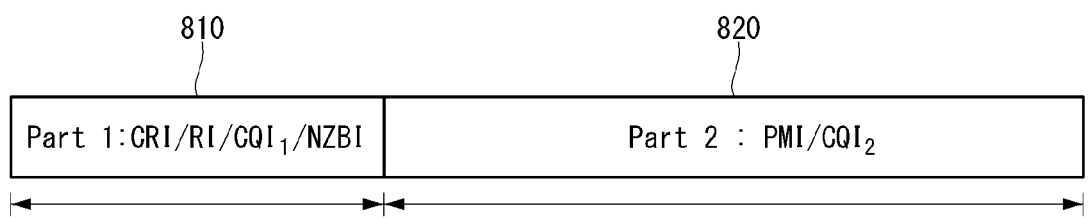
FIG. 8 illustrates an example information payload of PUSCH-based CSI reporting.

FIG. 8 shows an example of information payload of PUSCH-based CSI reporting.

NZBI is a parameter representing an indication of the number of non-zero wideband amplitude coefficients for each layer in Type II PMI code book.

When DCI is decoded, a UE performs aperiodic CSI reporting using a PUSCH of a serving cell c.

The aperiodic CSI reporting performed on the PUSCH supports wideband and sub-band frequency granularity.

The aperiodic CSI reporting performed on the PUSCH supports Type I and Type II CSI.

If DCI format 0_1, which activates a semi-persistent (SP) CSI trigger state, is decoded, a UE performs SP CSI reporting on the PUSCH.

DCI format 0_1 includes a CSI request field indicative of an SP CSI trigger state to be activated or deactivated.

SP CSI reporting on the PUSCH supports Type I and Type II CSI having wideband and sub-band frequency granularity.

A PUSCH resource and a Modulation and Coding Scheme (MCS) for SP CSI reporting are semi-persistently allocated by UL DCI.

CSI reporting for the PUSCH may be multiplexed with UL data on the PUSCH.

In addition, CSI reporting for the PUSCH may be performed without being multiplexed with UL data.

Figure 16:
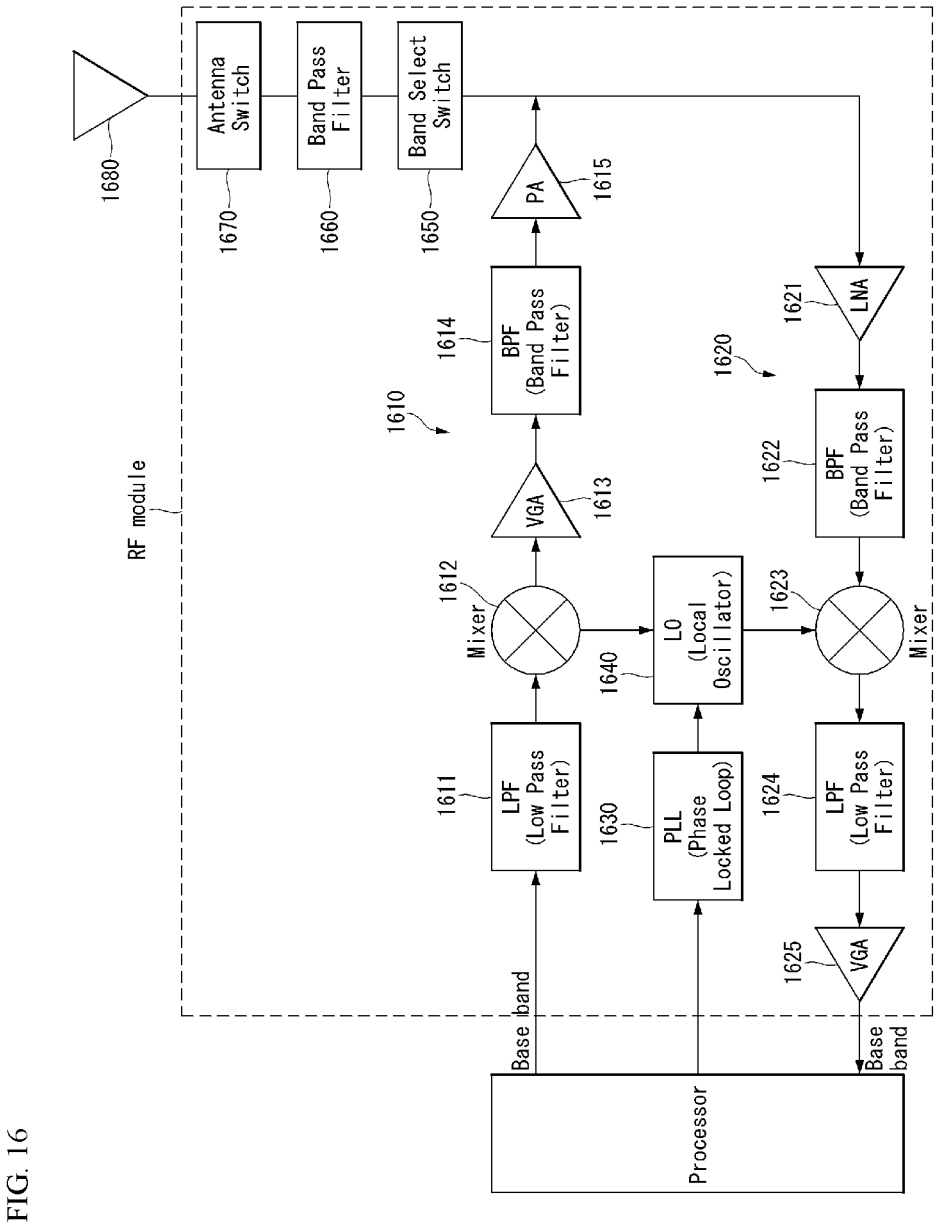
FIG. 16 is a view illustrating another example RF module of a wireless communication device to which a method proposed herein is applicable.

As illustrated in FIG. 16, regarding Type I and Type II CSI, CSI reporting on the PUSCH may include two parts (Part 1 and Part 2) illustrated in FIG. 16.

Part 1 (810) is used to identify the number of information bits of Part 2 (820). Part 1 is entirely transmitted before Part 2.

Regarding Type I CSI feedback, Part 1 includes (when reported) RI, (when reported) CRI, and CQI of the first codeword.

Part 2 includes a PMI, and, when RI>4, parts 2 includes a CQI.

Regarding Type II CSI feedback, Part 1 has a fixed payload size and includes an RI, a CQI, and an indication (NZBI) indicative of the number of non-zero wideband amplitude coefficients for each layer of Type II CSI.

In Part 1, the RI, the CQI, and the NZBI are encoded additionally.

Part 2 includes a PMI of Type II CSI.

Part 1 and Part 2 are additionally encoded.

A Type II CSI report transmitted on the PUSCH is calculated independent of every Type II CSI reporting transmitted on PUCCH format 1, 3, or 4.

If higher layer parameter reportQuantity is set to one of "cri-RSRP" or "ssb-Index-RSRP", a CSI feedback is composed of a single Part.

Regarding Type I and Type II CSI reporting which are configured for a PUCCH but transmitted on a PUSCH, an encoding scheme follows an encoding scheme of the PUCCH.

If CSI reporting includes two parts in the PUSCH and a CSI payload is smaller than a payload size provided by a PUSCH resource allocated for CSI reporting, the UE may omit some of Part 2 CSI.

Omission of Part 2 CSI is determined by a priority order, and Priority 0 is the highest priority and $2N_{Rep}$ is the lowest priority.

CSI Reporting Using PUCCH

A UE is configured semi-statically by a higher layer in order to perform periodic CSI reporting on a PUCCH.

The UE may be configured by higher layers for multiple periodic CSI reports corresponding to one or more higher layer configured CSI reporting setting Indications, where the associated CSI Measurement Links and CSI Resource Settings are higher layer configured.

In PUCCH format 2, 3, or 4, periodic CSI reporting supports Type I CSI based on a wide bandwidth.

Regarding SP CSI on a PUSCH, the UE performs SP CSI report on a PUCCH which has applied from a slot n+ $3N_{slot}^{subframe,\mu}+1$ after HARQ-ACK corresponding to a PDSCH carrying a selection command was transmitted from a slot n.

The selection command includes one or more report setting indications where associated CSI resource settings are configured.

The SP CSI report supports Type I CSI on the PUCCH.

SP CSI report in PUCCH format 2 supports Type I CSI having a wide bandwidth frequency granularity. SP CSI report in PUCCH format 3 or 4 supports Type I sub-band CSI and Type II CSI having a wide bandwidth granularity.

When the PUCCH carries Type I CSI having a wide bandwidth frequency granularity, CSI payloads carried by PUCCH format 2 and PUCCH format 3 or 4 are the same, irrespective of (when reported) RI, (when reported) CRI.

In PUCCH format 3 or 4, Type I CSI sub-band payload is divided into two parts.

The first part (Part 1) includes (when reported) RI, (wen reported) CRI, and CQI of the first codeword.

The second part (Part 2) includes PMI, and, when RI>4, the second part (Part 2) includes CQI of the second codeword.

SP CSI reporting carried in PUCCH format 3 or 4 supports Type II CSI feedback, but only Part 1 of Type II CSI feedback.

In PUCCH format 3 or 4 supporting Type II CSI feedback, CSI report may depend on a UE capability.

Type II CSI report (only Part 1 thereof) carried in PUCCH format 3 or 4 is computed independently of Type II CSI report carried in the PUSCH.

When the UE is configured with CSI reporting in PUCCH format 2, 3, or 4, each PUCCH resource is configured for each candidate UL BWP.

Where the UE receives active SP CSI reporting configuration in the PUCCH but does not receive a deactivation command, when the BWP in which CSI reporting is performed is an active BWP, CSI reporting is performed and, otherwise, CSI reporting is temporarily stopped. The operation applies likewise even in the case of CSI on PUCCH. If BWP switching occurs for PUSCH-based SP CSI reporting, the CSI reporting is appreciated as automatically deactivated.

Table 7 shows an example of a PUCCH format

TABLE 7

| PUCCH format | Length in OFDM symbols $N_{symb}^{PUCCH}$ | Number of bits |
| --- | --- | --- |
| 0 | 1-2 | ≥2 |
| 1 | 4-14 | ≥2 |
| 2 | 1-2 | >2 |
| 3 | 4-14 | >2 |
| 4 | 4-14 | >2 |

In Table 7, $N_{symb}^{PUCCH}$ indicates a length of PUCCH transmission in an OFDM symbol.

In addition, depending on the length of PUCCH transmission, the PUCCH format may be classified as a short PUCCH or a long PUCCH.

In Table 7, PUCCH format 0 and 2 may be called the short PUCCH, and PUCCH format 1, 3, and 4 may be called the long PUCCH.

Hereinafter, regarding PUCCH-based CSI reporting, short PUCCH-based CSI reporting and long PUCCH-based CSI reporting will be described in more detail.

Figure 9:
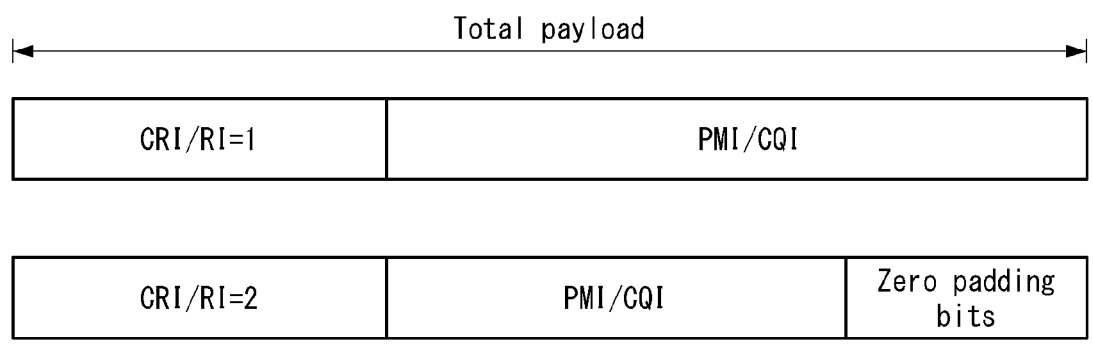
FIG. 9 illustrates an example information payload of short PUCCH-based CSI reporting.

FIG. 9 shows an example of information payload of short PUCCH-based CSI reporting.

The short PUCCH-based CSI reporting is used only for wideband CSI reporting.

The short PUCCH-based CSI reporting has the same payload regardless of an RI/CRI in a given slot (in order to avoid blind decoding).

A size of the information payload may be different between the maximum CSI-RS ports of a CSI-RS configured in a CSI-RS resource set.

When a payload including a PMI and a CQI are diversified to including an RI/CQI, padding bits are added to the RI/CRI/PMI/CQI before an encoding procedure for equalizing a payload associated with different RI/CRI values.

In addition, the RI/CRI/PMI/CQI may be encoded with the padding bits, when necessary.

Next, long PUCCH-based CSI reporting will be described.

Figure 10:
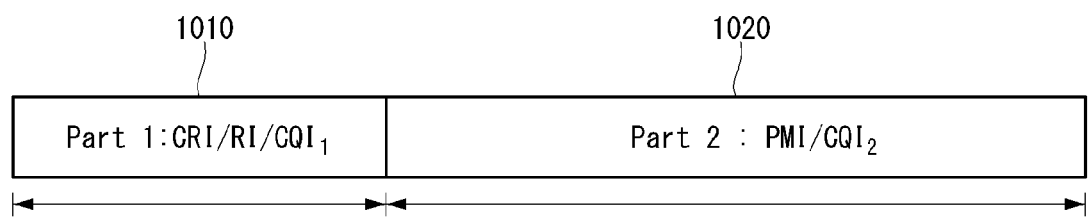
FIG. 10 illustrates an example information payload of long PUCCH-based CSI reporting.

FIG. 10 shows an example of information payload of long PUCCH-based CSI reporting.

For wideband reporting, the long PUCCH-based CSI reporting may use the same solution as that of the short PUCCH-based CSI reporting.

The long PUCCH-based CSI reporting has the same payload regardless of an RI/CRI.

For sub-band reporting, Two-part encoding (For Type I) is applied.

Part 1 (1010) may have a fixed payload according to the number of ports, a CSI type, RI restriction, and the like, and Part 2 (1020) may have a variety of payload sizes according to Part 1.

The CSI/RI may be first encoded to determine a payload of the PMI/CQI.

In addition, CQIi(i=1,2) corresponds to a CQI for the i-th codeword (CW).

Regarding a long PUCCH, Type II CSI reporting may carry only Part 1.

Since the next-generation system (i.e., the NR system) uses more antennas and wider bandwidth in the base station, the size of the channel state information (CSI) the UE transmits to the base station may increase. In this case, transmission of CSI using the PUSCH as well as the PUCCH may be efficient to effectively transmit larger CSI (i.e., CSI payload). At this time, to transmit the CSI via the PUSCH, the base station may allocate an uplink resource to the UE via the downlink control information (DCI) (e.g., the UL grant). The CSI transmission may be performed periodically as necessary.

To perform periodic CSI reporting based on the PUSCH, it may be preferable to allocate periodic PUSCH resources rather than periodically transmitting UL grants. Thus, there is a need for considering a method for allocating periodic PUSCHs for transmitting uplink control information (UCI), such as CSI.

Hereinafter, according to the disclosure, there are proposed an association with a method and procedure of semi-persistent scheduling, which is a method for periodic PUSCH transmission and a method of using the same in the legacy system (e.g., LTE system) and/or next-generation system (e.g., NR system).

In other words, according to the disclosure, there is proposed a method and procedure for setting a semi-persistent CSI configuration using periodic PUSCHs. However, it is apparent that the embodiments and methods proposed herein may also apply to PUCCH-based semi-persistent CSI, aperiodic CSI, and/or periodic CSI. It is also obvious that the embodiments and/or methods proposed herein may apply to other configurations (e.g., semi-persistent scheduling and configurations for grant-free uplink transmission (i.e., grant-free scheduling) using similar configuration methods and procedures.

As mentioned above, in the next-generation system (e.g., NR system), the UE may perform CSI measurement and/or reporting according to several measurement link configurations by a combination of CSI measurement resource configurations (e.g., the above-described CSI resource setting) and reporting configurations (e.g., the above-described CSI reporting setting). Further, aperiodic, semi-persistent, or periodic CSI reporting and/or retransmission of the reference signa may be supported. At this time, semi-persistent reporting and aperiodic reporting may be configured to be supported via the PUSCH or PUCCH, and periodic reporting may be configured to be supported via the PUCCH.

Hereinafter, according to the disclosure, there are proposed specific methods related to resource configuration upon transmission of semi-persistently configured CSI (i.e., upon semi-persistent CSI transmission) and apparatus for the same.

First described is a method of configuring, e.g., resource configuration and reporting configuration related to the semi-persistently configured CSI. It is assumed below that there are set K measurement link configurations for semi-persistent CSI.

At this time, the resource configuration (or resource setting) may be configured as in the following examples.

For example, where each semi-persistent CSI measurement is transmitted via the PUSCH, PUSCH resource configuration may be performed separately. Such PUSCH resource configuration may be assumed to be configured in a scheme described below according to the disclosure. It may be assumed in the configuration that where a dynamic slot format indicator (SFI) is configured, the UE performs reporting only when the reporting resource is valid with the reference RS deemed valid according to the dynamic SFI. It may otherwise be assumed that the resource is valid according to configuration.

As another example, the semi-persistent scheduling (SPS) PUSCH resource that may be shared by semi-persistent CSI measurement may be configured to be commonly shared. The period of the SPS PUSCH may be configured by the network (e.g., the base station) and it may be assumed that only when the SPS PUSCH resource or PUSCH is available in the period of semi-persistent reporting, the UE performs CSI reporting and, otherwise, the UE skips semi-persistent CSI reporting. Similarly, it may be assumed in the configuration that where a dynamic SFI is configured for reporting, the UE performs reporting only when the reporting resource is valid with the reference RS deemed valid according to the dynamic SFI. It may otherwise be assumed that the resource is valid according to configuration. Sharing with one resource may mean that sharing with data is possible. In this case, the UE may be configured to transmit CSI via aggregation of all overlapping semi-persistent reports or to select one of them based on some priorities (e.g., based on CSI type I or II, BLER target, etc.) and transmit CSI via the selected one.

Further, where CSI reporting is skipped because the reference resource is valid but the reporting resource is not, such reporting may consider additional schemes as follows. In the disclosure, reference resource may refer to a resource used to transmit the reference signal from the base station to the UE so as to determine and/or measure the channel state. As an example, the reference resource related to CSI reporting may mean a resource in which the CSI-RS is allocated and transmitted.

First, where the reference resource is invalid upon the next reporting occasion so that reporting needs to be skipped, the UE may be configured to report a prior measurement that has not been reported before rather than skipping CSI reporting. Or, the UE may be configured to piggyback the report to a valid PUSCH or PUCCH and transmit the same in the future.

Where the reference resource is invalid by, e.g., dynamic SFI, the UE may be configured to report a previous value according to the network configuration. In particular, where CSI is transmitted in the form of SPS PUSCH, since such transmission may be used for the purpose of channel estimation instead of SRS, the UE may transmit the CSI if the reporting resource is valid although the reference resource is invalid so that CSI reporting is skipped (i.e., dropped). In this case, the transmission may be to fill with the prior CSI value or zero. Or, where the reference resource is not valid due to missing group common (GC) PDCCH, at least if the reporting resource is valid, the UE may report the prior CSI value or transmit zero. Or, even in such a case, the UE may be configured to always skip uplink transmission.

In the case of semi-persistent CSI, no drop occurs due to collision with other CSI. However, if a collision occurs, the following methods may be taken into account. In other words, if semi-persistent CSI reporting collides with other channel and/or other reference signal, the following schemes may apply.

First described are methods of processing collision when the UE is scheduled to perform CSI reporting via the PUCCH.

Specifically, where the UCI of the PUCCH is piggybacked to the PUSCH due to collision with the PUSCH although the CSI is scheduled with the PUCCH, whether to piggyback the CSI may be determined depending on the beta-offset value set by the network (e.g., the base station). In this case, the network, although coming up with no aperiodic CSI trigger, may dynamically indicate the beta-offset, allowing processing for piggyback to be processed. And/or, the beta-offset may be set to differ per semi-persistent CSI reporting configuration. Further, such processing may also be carried out on periodic CSI reporting configuration.

It may also be assumed that the UE always transmit the CSI only with the configured resource in the case of semi-persistent CSI. Thus, upon PUSCH piggyback, the CSI may be dropped.

Next described are methods of processing collision when the UE is scheduled to perform CSI reporting via the PUSCH.

Specifically, if the PUSCH-based CSI collides with other scheduled PUSCH, the UE may perform piggyback only when the PUSCH includes no aperiodic CSI. At this time, the beta-offset value may be processed in a similar manner to the above-described scheme. Or, where the PUSCH-based CSI collides with other scheduled PUSCH, the PSUCH for semi-persistent CSI may be dropped.

Unlike this, if the PUSCH-based CSI collides with other PUCCH, the PUCCH may be dropped according to the CSI collision rule and, thereafter, if the CSI is not included but an HARQ-ACK is included, the UE may be configured to piggyback the HARQ-ACK upon PUSCH transmission. At this time, where the UE does not support simultaneous transmission of the PUCCH and PUSCH, the semi-persistent CSI may be dropped. Further, where the PUSCH-based CSI collides with other PUCCH, if the PUCCH includes a scheduling request (SR), similar processing to the above-described HARQ-ACK scheme may be performed or a method of joint-encoding the CSI and SR may be considered.

Unlike this, where the PUSCH-based CSI collides with the sounding reference signal (SRS), the SRS may be dropped, the CSI-RS may be dropped, or configuration between the two may be relied on.

Unlike this, where no PUSCH is scheduled but a PUCCH is scheduled in the resource, if there is data to be transmitted and the resource is configured as a TBS (i.e., a resource for data transmission), the UE may be configured to transmit CSI and data via UCI piggyback. Otherwise, the UE may be configured to transmit the CSI alone.

Unlike this, if the PUSCH-based CSI collides with a grant-free PUSCH (i.e., a PUSCH which is not based on a grant), the grant-free PUSCH may have a higher priority, or any one of the CSI or piggyback CSI may be dropped. This may be based on the network configuration.

The above-described collision may occur between the uplink (UL)/supplementary uplink (SUL), not in one carrier, or may occur between other UL carriers. In such a context, different processing may be performed.

It is first assumed that the case of semi-persistent PUSCH is limited to only one carrier when the UE receives UL/SUL configuration and may dynamically move the PUSCH resource between the UL/SUL. In connection with whether the assumption that one UE may transmit one PUSCH corresponds, the following processing schemes may be considered.

For example, where the PUCCH and the PUSCH may simultaneously be transmitted in the UL/SUL, it may be assumed that simultaneous transmission of the PUSCH and PUSCH for semi-persistent CSI (i.e., UL-SCH-free PSUCH) is possible similarly. At this time, an additional assumption may be made that piggyback is performed only in the power limited context.

And/or, in this case, the UL-SCH-free PUSCH may be simultaneously transmitted in the UL/SUL. At this time, an additional assumption may be made that piggyback is performed only in the power limited context.

And/or, in this case, only one PUSCH may be assumed regardless of what has been described above. Thus, such a method may be considered as to piggyback the CSI to the transmission PUSCH or drop the CSI.

And/or, in this case, it may be assumed that the PUSCH of semi-persistent CSI is transmitted always without UL-SCH upon configuring at least one or more UL carriers. At this time, an additional assumption may be made that piggyback is performed only in the power limited context.

As another example, where the UE is configured for several carriers, the UL-SCH-free PUSCH, like in the above-described SUL case, may be configured to perform similar processing to that of the PUCCH. Accordingly, where the PUCCH and the PUSCH may be simultaneously transmitted, the UE may simultaneously transmit the UL-SCH-free PUSCH and other PUSCH.

Or, such a configuration may be made as to perform piggyback so that all the UCIs are transmitted via one PUSCH by regarding it as the UL-SCH-free PUSCH. In this case, if the CSI of the UL-SCH-free PUSCH is transmitted via other PUSCH, the corresponding channel may be dropped.

Or, such a configuration applies only when the two PUSCHs collide in one carrier and, otherwise, the UL-SCH-free PUSCH and the PUSCH may be configured to be transmitted simultaneously. Such a configuration may also be configured that when power is not limited, the corresponding scheme is supported and, if power is limited, UCI piggyback is carried out between carriers.

If the UE assumes that the measurement resource for CSI reporting is invalid (e.g., upon failing to receive the dynamic SFI), CSI reporting may not be performed. Or, where the bandwidth part (BWP) of the UE changes between the measurement reference resource and the report, if the reporting configuration in the BWP lacks a measurement link with the resource set corresponding to the prior reference resource, the UE may drop the CSI report.

For example, when RS configuration 1 of DL BWP1 and reporting configuration 1 of UL BWP1 are a single link, new DL BWP2 includes RS configuration 1, but UL BWP2 may include reporting configuration 2 instead of reporting configuration 1. At this time, if reporting configuration 2 has no measurement link relationship with reporting configuration 1, reporting for reporting configuration 1 may be dropped. In other words, although those for the reference resource follow the DL BWP and measurement is also performed according to the DL BWP, if the reporting configuration is varied as the UL BWP is changed, the UE may be configured not to report invalid reference resources while assuming that only the reporting configuration mapped to the corresponding reporting configuration is valid. Similarly, even when the DL BWP is varied so that the reference resource is changed, if there is no mapping between the reporting configuration and the changed resource configuration, the UE may determine that this is invalid.

To that end, it may be assumed that there is a resource configuration per DL BWP, and such resources are mapped. At this time, if the resource configuration includes a configuration for other region than the BWP, it may be assumed that only the resource in the BWP is valid.

And/or, it may also be assumed that there is a reporting configuration per UL BWP and such a reporting configuration is present. In this case, each report type and resource may be configured per BWP.

And/or, each resource-report link configuration (i.e., resource-report mapping) may be configured regardless of the BWP. As an example, if unpaired, such a mapping scheme may be configured according to each DL-UL BWP pair.

And/or, in the case of feedback scheme 1, the UE may assume that the resource configuration in the active DL BWP is valid. The UE may also assume that the resource configuration in the active UL BWP is valid. Further, the UE may be configured to feedback only valid resource-report mapping of the measurement link configuration. Such a method may be assumed to apply only to periodic CSI (P-CSI) or semi-persistent CSI (SP-CSI).

And/or, upon each validation command, the UE may receive configuration of the CSI reporting configuration that may be activated per configured UL BWP. This may mean configuring the SP-CSI activated for the UL BWP configured by one MAC CE or DCI. In this case, when a configuration is given with no UL BWP index or per UL BWP using the index (e.g., ID) of the reporting configuration per UL BWP, activation may be performed on the per-configured UL BWP configurations.

For example, where 2, 3, 4, and 5 reports are configured for four UL BWPs, the indexes of 0-1, 2-4, 5-8, and 9-13 may be allocated to the UL BWPs, and activation may be performed per index. It is assumed that the index is activated only when the corresponding UL BWP is activated and it is activated by the DCI and/or MAC CE.

Further, one resource configuration may belong to a plurality of UL BWPs. Thus, the UL BWP applied per reporting configuration may be configured, and activation may be carried out using each index. Where the corresponding reporting configuration is activated, and one of the applied UL BWPs is activated, the corresponding report may be assumed to be valid. Further, the UE may perform measurement using the resource linked to the corresponding report.

Or, a similar scheme to those described above may apply to the measurement link index. A UL BWP set and a DL BWP set applicable per measurement link configuration may be configured for the UE. It may be assumed that each measurement link configuration is valid when the UL/DL BWPs are activated one-by-one in each set.

The UE may determine the activated/valid reporting set according to the active UL BWP and designate a reference resource according to the resource configuration associated with the corresponding report. If no reference resource is included in the current BWP, the UE may assume that the reference resource is invalid and drop it. Such a scheme may apply only to periodic CSI or semi-persistent CSI.

The above-described CSI-related configurations may be summarized as follows.

First, the measurement link configuration may include the reporting configuration (reporting config), resource configuration (resource config), measurement configuration (measurement config), available UL BWP set, available UL BWP set (or available DL/UL BWP pair set), etc. Based on the measurement link configuration, the UE may determine the measurement link configuration applicable according to the current activated DL/UL BWP and assume that only the activated configurations of the same are valid. Further, the index of the measurement link configuration and/or the index of the reporting configuration may be assumed to be transmitted via the activated MAC-CE and/or DCI. Where the index of the reporting configuration is transmitted, the measurement link configuration associated with the configuration may be assumed to be valid.

Next, the measurement reporting configuration may include a set of available UL BWPs. Based on the measurement link configuration, the UE may determine the measurement reporting configuration applicable according to the current activated UL BWP and assume that only the activated configurations of the same are valid. Further, the index of the measurement link configuration and/or the index of the reporting configuration may be assumed to be transmitted via the activated MAC-CE and/or DCI. Where the index of the reporting configuration is transmitted, the measurement link configuration associated with the configuration may be assumed to be valid. Further, where the index of the measurement link configuration is transmitted, the reporting configuration belonging to the measurement link may be assumed to be valid.

Next, in the case of per-BWP measurement reporting and reference signal (i.e., resource of reference signal) configuration, the UE may assume that the activated sets of the reference signal configuration and reporting in the activated BWP are activated. At this time, if the activated BWP is changed, it may be assumed that the corresponding set is varied.

At this time, it may be required to separately process the reporting configuration and the reference signal configuration (i.e., reference signal resource configuration) assuming that the DL BWP and the UL BWP are separately varied. In this case, the reporting configuration set is varied according to the UL BWP, and the UE may assume that only measurement link configurations are reported in which the reference signal associated with the activated reporting configurations of the corresponding reporting configurations is valid.

Alternatively, reporting configurations and reference signal configurations may be designated for all the DL-UL BWP pairs, and a reporting configuration and reference signal configuration may be selected according to the activated DL-UL BWP pair.

And/or, in the case of feedback scheme 2, the UE may be configured to determine the reporting configuration according to the UL BWP and perform measurement on the reference resource associated with the report set via the measurement gap if it is off the DL BWP. In this case, the UE may perform switching to the corresponding reference resource and measurement on the reference resource based on the measurement gap. Such a scheme may apply only to aperiodic CSI (AP-CSI).

The CSI reporting-related CSI reporting configuration and reference signal configuration (i.e., reference signal resource configuration) (e.g., CSI-RS resource configuration) may be configured and/or assumed as described above.

In connection with the above-described CSI reporting and measurement, described below according to the disclosure are a method for semi-persistent CSI configuration (hereinafter, a first embodiment), a method of identifying the DCI for semi-persistent CSI configuration (hereinafter, a second embodiment), a method of activation configuration between the semi-persistent CSI configuration and the BWP (hereinafter, a third embodiment), a method of identifying the CSI configuration related to the slot format and/or time division duplexing (TDD) configuration (hereinafter, a fourth embodiment), and a method of processing the validity of CSI configuration (hereinafter, a fifth embodiment).

The embodiments described below are divided for ease of description, and the respective configurations of the embodiments may be combined together or replaced with each other.

Although image signal processor CSI configuration using periodic PUSCH is described in the following embodiments, the methods proposed herein may also apply to PUCCH-based semi-persistent, periodic, and aperiodic CSI configurations.

First Embodiment

First, a method for configuring a semi-persistent CSI is described. As set forth above, periodic PUSCHs may be allocated to (or configured for) the UE for persistent CSI transmission. At this time, as methods for allocating the periodic PUSCHs to the UE, legacy semi-persistent scheduling (SPS) and/or grant-free UL transmission may be considered.

To reduce signaling overhead or grant-to-UL transmission delay occurring to the UE, the legacy system (e.g., LTE system) and the next-generation system (e.g., NR system) allocates periodic PUSCHs to the UE using, e.g., physical layer signaling (e.g., L1 signaling) and/or higher layer signaling. Thus, the PUSCH may be allocated using a similar scheme to periodic PUSCH allocation (for user data, i.e., UE data), and uplink control information (UCI) may be transmitted in the PUSCH.

What may be considered first is a method of configuring periodic PUSCHs for CSI based on the legacy SPS and/or grant-free procedure. In other words, to allocate periodic PUSCHs for CSI, SPS and/or grant-free configuration may be used. In particular, the SPS and/or grant-free configuration may include whether random or pre-configured UCI is transmittable and/or whether UCI piggyback is possible.

Specifically, the UE may be configured to support at least one of modes 1 to 3 as follows.

For example, based on the SPS and/or grant-free configuration, the UE may be configured to transmit data only in the PUSCH (mode 1).

As another example, based on the SPS and/or grant-free configuration, the UE may be configured to transmit only UCI, but not data (i.e., UE data or UL-SCH), in the PUSCH (mode 2). At this time, the transmittable UCI may be pre-configured by physical layer signaling (e.g., L1 signaling) and/or higher layer signaling.

As an example, based on the SPS and/or grant-free configuration, the UE may be configured to punctuate or rate-match part of the resource element to be transmitted in the data and transmit the UCI (mode 3). At this time, the transmittable UCI and/or per-UCI transmission method (e.g., punctuation or rate matching) may be pre-configured by physical layer signaling (e.g., L1 signaling) and/or higher layer signaling.

Information for the mode used among the above-described modes, available mode, type of UCI piggybackable, and/or piggyback method of each UCI may be transferred or predefined by physical layer signaling and/or higher layer signaling used for the SPS and/or grant-free configuration. As an example, the base station may configure the available mode, transmittable UCI, and transmission method of the UCI for the UE by higher layer signaling and indicate the same via the CQI request field of the physical signaling.

Further, in the UCI piggyback mode, the UCI piggyback may be performed in the same manner as the typical UCI transmission on PUSCH without separate signaling. Or, where there is no separate signaling, the typical piggyback method used for UCI on PUSCH may apply.

Whether the above-described modes are available and/or are used may be implicitly indicated via physical layer signaling and/or higher layer signaling without adding a separate field or parameter. Specifically, where a combination of some parameters of the higher layer signaling, a combination of some field values of the physical layer signaling, and/or each indicates a specific value or falls within a certain range, the UE may determine that the specific mode is used or available.

For example, where the modulation and coding scheme (MCS) to be used for the SPS and/or grant-free configuration indicates a value (e.g., a reserved value) that is not used in common PUSCH transmission or a specific value, the UE may determine that this is mode 2 (i.e., UCI only mode). Where the allocated RB and/or transmittable transport block size (TBS) is a predetermined value or less, the UE may determine that this is mode 1 (i.e., DATA only mode) for URLLC user data transmission or mode 2 (i.e., UCI only mode) for transmission of small-size UCI.

CSI transmission may require an additional configuration for, e.g., a reference signal (transmitted by the base station) used for the UE to grasp the channel state, as well as the uplink resource for transmission. Since such CSI information is time-sensitive, unlike common UL-SCH transmission, retransmission via the HARQ scheme may be unnecessary although transmission fails.

Thus, such a method may also be considered as to configure a semi-persistent CSI configuration separately from the legacy SPS and/or grant-free configuration but apply PUSCH allocation for CSI transmission, in a similar manner to the SPS and/or grant-free scheme.

Specifically, to allocate the periodic PUSCH resource for CSI transmission, a separate configuration other than the SPS and/or grant-free configuration, a semi-persistent CSI (SP-CSI) configuration may be used.

For example, the SP-CSI configuration may consist of semi-static SP-CSI configuration and dynamic SP-CSI configuration. At this time, the semi-static SP-CSI configuration may include configuration for CQI, PMI, and RI measurement and configuration for periodicity similarly to the legacy periodic/aperiodic CSI reporting except for the uplink resource. The dynamic SP-CSI configuration may include information for the PUSCH resource and offset for the UE to use in CSI transmission and, if necessary, information necessary for CSI measurement.

Second Embodiment

By grant-free type 2 Ul data transmission, the SP-CSI on the PUSCH may be activated/deactivated by the DCI. In the SP-CSI design, there need to be considered a method of configuring the 'resource' and a method of activating the SP-CSI in the position where the SP-CSI is transmitted (i.e., semi-persistent PUSCH resource configuration).

Under the assumption that the PUSCH for SP-CSI transmits only SP-CSI without UL-SCH, the UE may regard it as UCI piggyback for the UL-SCH-free PUSCH. In this case, there may be need a mechanism for separating the SP-CSI PUSCH configuration from other type ½ configuration. Assuming that the PUSCH for SP-CSI may transport UL-SCH, it may normally be similar to the type 2 configuration. Since the resource of type 2 for UL-SCH is periodic, and the periodicity of SP-CSI for UL-SCH has a chance of being aligned with the periodicity of type 2, the PUSCH resource for SP-CSI may need to be configured regardless of the presence or absence of UL-SCH.

In such a case, the type 2 framework may be reused for SP-CSI.

For example, at least two type 2 configurations may be supported for a given cell. At this time, if two configurations are provided, one may be configured for UL-SCH-free SP-CSI and the other for the type 2 purpose constituted of UL-SCH. Or, if a single configuration is given, such a configuration may be made that one type 2 configuration is used for the UL-SCH with an SP-CSI or UL-SCH-dedicated if the SP-CSI is activated.

As another example, if two configurations are given in the active DCI for type 2, other RNTI may be available between the PUSCH of the UL-SCH-free SP-CSI and the type 2 PUSCH of the UL-SCH.

As another example, if one configuration is given in the active DCI for type 2, the SP-CSI may be regarded as valid if an aperiodic CSI is triggered in the active DCI. Otherwise, the aperiodic CSI may be regarded as inactive.

If a dedicated configuration is assumed for other SP-CSI PUSCH than the type 2 configuration in which the SP-CSI PUSCH may carry only CSI without UL-SCH, such a configuration may be made that separate RNTI is used between other configurations.

It also needs to be determined whether one SP-CSI reporting configuration is present per given cell or whether there may exist multiple SP-CSI reporting configurations that may select one or more dynamic cells via a physical layer-based activation signal. As an example, where physical layer signaling (e.g., L1 signaling) needs to select one or more SP-CSI reporting configurations, such a method may be considered in which the aperiodic CSI trigger field is reused in the UL grant. In other words, the aperiodic CSI trigger field may be reused to activate one or more of the SP-CSI configurations. In this case, it may be assumed that mapping between the set of SP-CSI configurations and the aperiodic CSI trigger value is configured semi-statically.

In relation to what has been described above, a method of identifying DCI for semi-persistent CSI configuration is described below in detail.

In the methods described above in connection with the first embodiment, the PUSCH resource information used for CSI transmission may be transferred via, e.g., DCI. At this time, to reduce the count of blind decoding of the UE in the DCI format to be used, such a method may be used as to use the same UL grant as that used for common PUSCH resource allocation or at least the same bit size of DCI.

In this case, an additional method may be necessary for distinguishing the DCI for PUSCH allocation of semi-persistent SP-CSI from the common UL grant of the same size of DCI received by the UE. To that end, methods 1 to 3 as follows may be considered.

(Method 1)

A first method to be considered is to include, in the common UL grant, an indicator (e.g., an n-bit indicator where n is a natural number) (i.e., indication information) for distinguishing the DIC for PUSCH allocation of semi-persistent CSI from the common UL grant (i.e., DCI for common UL transmission).

Such an indicator may be used to distinguish the DCI for SPS and/or grant-free, as well as the DCI for PUSCH allocation of semi-persistent CSI, from the UL grant.

(Method 2)

And/or, for the UE to distinguish the UL grant from the DCI for SP-CSI, such a method may be considered that the base station performs CRC scrambling of DCI of semi-persistent CSI with other UE identifier (e.g., C-RNTI or SPS-C-RNTI) and other separate RNTI. In other words, the UL grant may be distinguished from the DCI for PUSCH allocation of semi-persistent CSI via the RNTI used for CRC scrambling on DCI.

At this time, the RNTI used may be allocated to the UE by the base station's higher layer signaling or may be elicited (by the UE) from the existing RNTI (e.g., C-RNTI or SPS-C-RNTI) previously allocated by a separate preset rule.

Where multiple semi-persistent CSI configurations may be configured for one UE in one serving cell in using method 2 described above, the multiple RNTIs may be allocated for their respective semi-persistent CSI configurations. In other words, the RNTI used for DCI scrambling per semi-persistent CSI configuration may be set to differ.

Where multiple semi-persistent CSI configurations may be configured for one UE in one serving cell in using method 2 described above, an indicator (e.g., an n-bit indicator where n is a natural number) (i.e., indication information) for distinguishing them may be included in the DCI format. In other words, multiple semi-persistent CSI configurations may be distinguished by the indicator.

Where multiple semi-persistent configurations may be configured for one UE in one serving cell and the legacy DCI format is used in using method 2 described above, the legacy DCI field may be used to distinguish them.

For example, where the legacy UL grant is used as the DCI format of the DCI for semi-persistent CSI, the HARQ process ID may be configured to indicate the index of each semi-persistent CSI configuration. Or, the indexes of different semi-persistent CSI configurations may be indicated by the CQI request field. Specifically, information indicating the aperiodic CSI trigger may be used to activate one or multiple semi-persistent CSI configurations. At this time, each bit and/or each value of the information indicating the aperiodic CSI trigger may be mapped to the semi-persistent CSI configuration or semi-persistent CSI configuration set.

In other words, as described above, the aperiodic CSI trigger field may be reused to activate one or more of the SP-CSI configurations. In this case, it may be assumed that mapping between the set of SP-CSI configurations and the aperiodic CSI trigger value is configured semi-statically.

Such a configuration may be made that the semi-persistent CSI configuration and the SPS and/or grant-free configuration use different activation/deactivation validation points in using method 2 described above.

For example, the RNTI and SP-CSI C-RNTI for the semi-persistent CSI configuration may be configured to be used only for activation or deactivation of the semi-persistent CSI. In contrast, the RNTI and configured scheduling (CS)-RNTI for SPS and/or grant-free may be used for dynamic grant of allocating PUSCH resource of UL-SCH retransmission as well as for activation and deactivation. Thus, although different RNTIs are used, a more flexible validation point may be secured in the SP-CSI C-RNTI. Since the payload size of the UCI, e.g., CSI, may be obtained in other ways than the legacy TBS of UL-SCH, the parameters used for such calculation may be additionally used only for validation point for semi-persistent CSI signaling.

Specifically, in relation to DCI signaling using the RNTI (e.g., SP-CSI C-RNTI) for semi-persistent CSI, only the validation point used for deactivation may be determined, and other signaling all may be assumed as active. At this time, the following DCI fields may be used as available to deactivation.

frequency-domain resource assignment
time-domain resource assignment
HARQ process number (HPN)
modulation and coding scheme (MCS)
new data indicator (NDI)
redundancy version (RV)
TPC command for scheduled PUSCH To distinguish from the common DCI (e.g., UL grant), all such field values may be represented as 0's or 1's. In particular, since the deactivation message need not transmission and resource allocation for the message, the resource allocation used for determining transmission parameter and resource allocation, HARQ process number, MCS, and/or RV fields may be configured to be used. Among the above-described DCI fields, only fields commonly used for DCI format 0_0 and DCI format 0_1 may be defined. Such deactivation determination conditions may be set to be similar to the determination conditions of deactivation DCI of SPS and/or grant-free.

As another example, some conditions may be added to the validation point used for DCI signaling using CS-RNTI, and a validity check may be performed on the activation or deactivation signaling of semi-persistent CSI. Specifically, the UE may be configured to determine that the DCI meeting both the condition used for UL-SCH triggering-free aperiodic CSI and the validation point of SPS and/or grant-free activation is the semi-persistent CSI activation DCI.

(Method 3)

Further, the RNTI used for SPS and/or grant-free may be used for retransmission grant of SPS and/or grant-free transmission and activation/deactivation of grant-free configuration and/or SPS. As set forth above, the CSI information that the UE transmits in CSI transmission is time-sensitive and, thus, HARQ scheme-based retransmission may be unnecessary.

Thus, unlike the SPS and/or grant-free configuration, the uses of DCI in the semi-persistent CSI may be more limited. In this case, although the DCI of the semi-persistent CSI is transmitted using the RNTI used in the SPS and/or grant-free, influence on the SPS and/or grant-free transmission procedure may be small.

In connection, for the UE to distinguish the common UL grant from the DCI for semi-persistent CSI, if the base station performs CRC scrambling of DCI on the semi-persistent CSI, such a method may be considered as to adopt or use the RNTI used in the SPS and/or grant-free. At this time, if there are multiple RNTIs used in the SPS and/or grant-free, selection of an RNTI may be carried out as in the following examples.

For example, where there is one RNTI for SPS and/or grant-free used in the serving cell where the semi-persistent CSI is configured, the base station and/or UE may use the RNTI as it is or modify and use the RNTI as per a preset rule.

As another example, where there is one RNTI for SPS and/or grant-free used in the serving cell where the semi-persistent CSI is configured and there are multiple semi-persistent CSI configurations, the base station and/or UE may use the RNTI as it is or modify and use the RNTI as per a preset rule. If some unique index is present for the semi-persistent CSI configuration, the base station and/or UE may be configured to change the RNTI for the SPS and/or grant-free using the index.

As another example, where there are multiple RNTIs for SPS and/or grant-free used in the serving cell where the semi-persistent CSI is configured and there is one semi-persistent CSI configuration, the base station and/or UE may use any one of the allocated RNTIs for the SPS and/or grant-free. If some unique index is present for the SPS and/or grant-free configuration, the base station and/or UE may be configured to use the RNTI for the SPS and/or grant-free of the first, last, or a preset index. At this time, the base station and/or UE may be configured to use the RNTI for the SPS and/or grant-free as it is or modify and use it as per a preset rule.

As another example, where there are multiple RNTIs for the SPS and/or grant-free used in the serving cell where the semi-persistent CSI is configured, there are multiple semi-persistent CSI configurations, and the SPS and/or grant-free configuration and the semi-persistent CSI configuration each have an index, the base station and/or UE may be configured to select the RNTI for the SPS and/or grant-free of the same index. At this time, the base station and/or UE may be configured to use the RNTI as it is or modify and use it as per a preset rule.

Where one RNTI is associated with two or more semi-persistent CSI configurations or SPS and/or grant-free configurations in one serving cell in using method 3 above, an indicator (e.g., an n-bit indicator where n is a natural number) (i.e., indication information) for distinguishing them may be included in the DCI format. In this case, the CRC scrambled DCI may be distinguished per configuration using the same RNTI.

Further, where one RNTI is simultaneously associated with one semi-persistent CSI configuration and one SPS and/or grant-free configuration in one serving cell using method 3 above, the semi-persistent CSI configuration and the SPS and/or grant-free configuration may be configured to use different activation/deactivation validation points.

Further, where one RNTI is simultaneously associated with one SPS and/or grant-free configuration and one or more semi-persistent CSI configurations in one serving cell using method 3 above, the semi-persistent CSI configurations and the SPS and/or grant-free configuration may be configured to use the same activation/deactivation validation point. Where each or a combination of some DCI field values except for the validation point indicates a specific value or falls within a certain range, the UE may determine that the DCI is one for semi-persistent CSI configuration. Where multiple semi-persistent CSI configurations are associated with the RNTI, the corresponding scheme may be used.

As an example, where the MCS field indicates a reserved value, a specific value or more or less, the UE may determine that the DCI is one for the semi-persistent CSI configuration. Or, where the allocated RB or transmittable TBS is a predetermined value or less, the UE may determine that the DCI is one for the semi-persistent CSI configuration. As a specific example, where multiple semi-persistent CSI configurations are associated with one RNTI, one of the multiple semi-persistent CSI configurations may be indicated via, e.g., the HARQ process field.

Third Embodiment

Further, the next-generation system (e.g., NR system) may consider UE-specifically allocating the frequency bandwidth the UE uses in bandwidth part (BWP) units. Thus, the frequency resource the UE uses may be varied by signaling of the base station or by a predefined timer.

At this time, where the resource the UE uses is preset via semi-static configuration (i.e., higher layer signaling) and/or physical layer signaling (e.g., L1 signaling), the UE may not use the corresponding resource by the BWP dynamically varied. In other words, where the BWP is varied by dynamic signaling separately from the resource configured for the UE, the UE may not use the preset resource. Given this, the following methods may be taken into consideration.

(Method 1)

Specifically, such a scenario case is assumed as to allocate uplink/downlink (UL/DL) resource for the UE by semi-static configuration (e.g., RRC signaling) and/or physical layer signaling (e.g., L1 signaling).

At this time, where the uplink (UL) resource for use in semi-persistent CSI reporting and/or the reference signal for use in CSI measurement is allocated, multiple resources and/or multiple reference signals may be allocated, and the UE may use them in different available BWPs. In other words, multiple resources and/or multiple reference signals may be allocated to different BWPs the UE may use (i.e., different BWPs configured to be used by the UE). At this time, multiple resources and/or multiple reference signals may be allocated to one or more BWPs (in duplicate).

In such a case, methods 1-1 and 1-2 as follows may be considered in relation to BWP activation and semi-persistent CSI configuration activation.

(Method 1-1)

It is assumed that in using method 1 above, some of the UL/DL resource candidates available to the UE are activated via physical layer signaling (e.g., L1 signaling) or the UL/DL resource available to the UE is allocated via higher layer signaling. At this time, multiple UL/DL resources available per BWP to the UE may be activated/deactivated, and the UE may use the UL/DL resource of the activated BWP (i.e., active BWP).

Specifically, where there are multiple UL/DL resource configurations (in particular, semi-persistent CSI configuration or PUSCH configuration for SPS and/or grant-free) available to the UE per BWP, the UE may be configured to use only the UL/DL resource present in the activated BWP among the configured or activated configurations.

In other words, in the case where the CSI configuration is used, the UL/DL resource to be used for CSI measurement and/or reporting may be configured for the UE over multiple BWPs. At this time, each semi-persistent CSI configuration may be activated regardless of whether its associated BWP is active, and the UE may be configured to perform CSI measurement and/or reporting only in the activated BWP.

At this time, the UL/DL resource available may be selectively activated among the candidates. The base station may notify the UE of the activated resource set by signaling (e.g., MAC CE or DCI).

In other words, each configuration (e.g., the semi-persistent CSI configuration or SPS and/or grant-free configuration) may be activated simultaneously or separately regardless of whether the BWP is activated. Further, each configuration may include associated BWP information or index. The UE may be configured to use only the activated configuration associated with the activated BWP when the BWP is activated/deactivated.

(Method 1-2)

In using method 1 above, the UL/DL resource (or UL/DL resource candidate) available may be automatically activated/deactivated as the BWP is activated/deactivated.

It is assumed that some of the UL/DL resource candidates available to the UE are activated via physical layer signaling (e.g., L1 signaling) or the UL/DL resource available to the UE is allocated via higher layer signaling. At this time, when the BWP is activated/deactivated, its associated UL/DL resource configuration (in particular, the semi-persistent CSI configuration or SPS and/or grant-free PUSCH configuration) may be automatically activated/deactivated.

For example, where the BWP for UL/DL transmission is configured for the UE, and CSI configurations (e.g., CSI reporting configuration or CSI-RS resource configuration) are configured for the UE, the configuration(s) associated with the corresponding BWP among the CSI configurations may be activated/deactivated depending on whether the BWP is activated/deactivated.

This scheme eliminates the need for additional signaling to indicate activation/deactivation for the CSI configuration, providing advantage in light signaling overhead. Since the UE determines the activation/deactivation of the CSI configuration depending on the activation/deactivation of BWP, the operation complexity of the UE may be lowered.

(Method 2)

When multiple BWPs or BWP candidates are allocated to the UE, such a scenario case is assumed as to allocate uplink/downlink (UL/DL) resource for the UE by semi-static configuration (e.g., RRC signaling) and/or physical layer signaling (e.g., L1 signaling).

At this time, where an uplink (UL) resource is allocated for use in SPS and/or grant-free transmission or semi-persistent CSI reporting, the DCI for allocation of the PUSCH or PDSCH may be applied simultaneously to all the BWPs or all the BWP candidates allocated to the UE or be used for resource allocation.

As an example, the resource configuration included in the physical layer activation signaling (e.g., L1 activation signaling) that the UE receives for semi-persistent CSI configuration may be all or some of the BWPs/BWP candidates allocated to the UE. At this time, the length of different BWPs (e.g., N^BWP_RB) may be set based on the smallest BWP.

In connection with the methods of the above-described third embodiment, the following may also be considered.

The semi-static resource configuration including the semi-persistent CSI (SP-CSI) configuration, the SPS and/or grant-free configuration, and the scheduling request (SR) may be influenced by a change in the BWP. In particular, the PUSCH configuration such as the SPS and/or grant-free and the activated/changed BWP may have a different number of resource blocks (RBs) from the number of BWPs previously activated. In this case, the PUSCH allocated to the prior BWP needs to be deactivated or changed. In other words, if the BWP is deactivated, the related configured resource may be automatically deactivated or be configured to be unavailable.

For seamless operation of such a configuration, several UL resource sets may be configured for the UE over several BWPs and/or BWP candidates. In this case, when the BWP is activated (or deactivated), the related UL resource may become available (or unavailable). Besides, the sub set of the UL resources in the resource set may be set or indicated to be available or unavailable by higher layer signaling and/or physical layer signaling (e.g., L1 signaling). In this case, only the available UL resource may be varied to be resource available to the UE.

In connection, the following methods may be taken into consideration.

First, in the case of type 1 resource configuration, a separate resource configuration may be used per configured UL BWP. At this time, the configuration of the current active UL BWP may be assumed to be valid for the type 1 resource.

In contrast, in the case of type 2 resource configuration, two methods as follows may be considered.

First, valid check may be applied only to the current active UL BWP and, if the active UL BWP is changed, the type 2 resource previously activated may be regarded as automatically invalidated. In this case, a new validity check may be required for the new active UL BWP for the type 2 resource. Based on physical layer signaling (e.g., L1 signal)-based activation, a similar scheme may also apply to semi-persistent CSI PSUCH (SP-CSI PUSCH).

Or, if the validity of the type 2 resource is identified, activation for several resources (one resource per BWP) may be considered. For example, at least the PUSCH resource may be semi-statically configured per BWP, and physical layer signaling (L1 signaling) may be used to indicate the resource activated in several BWPs.

An additional method to be considered in this case may be to transmit a validity check/invalidation DCI along with the index of the BWP that activates/deactivates the resource. For example, validation/invalidation of the type 2 resource or SP-CSI PUSCH may be done only by a physical layer signal (e.g., L1 signal), and no assumption for BWP switching may be considered. Further, validation/invalidation signaling may include a BWP index for activating/deactivating the resource of the inactive BWP. If a BWP switch occurs, the UE may assume that, if already activated, the type 2 resource or SP-CSI PUSCH is valid.

Fourth Embodiment

When the UL/DL resource configuration for CSI transmission (i.e., CSI reporting) and measurement is indicated as UL or DL by a dynamic SFI in a flexible slot, the corresponding resource may be configured as available. However, where the UE uses multiple resources in one transmission, where the overall resource is unavailable, i.e., when none of slots/mini-slots/symbols of the UL/DL resource used for transmission are indicated with the UL/DL resource, the UE may determine that the entire resource is unavailable.

Given this, the following methods 1 and 2 may be taken into consideration.

(Method 1)

Such a scenario case is assumed in which the base station allocates uplink/downlink (UL/DL) resource for the UE by semi-static configuration (e.g., RRC signaling) and/or physical layer signaling (e.g., L1 signaling). In particular, it is assumed that the base station allocates the UL resource for use in SPS and/or grant-free transmission or semi-persistent CSI reporting to the UE.

At this time, where the UE performs transmission over multiple scheduling units, when all the scheduling units are indicated as UL/DL by SFI or dynamic scheduling, the UE may be configured to determine that the corresponding resource is available.

(Method 2)

Such a scenario case is assumed in which the base station allocates uplink/downlink (UL/DL) resource for the UE by semi-static configuration (e.g., RRC signaling) and/or physical layer signaling (e.g., L1 signaling). In particular, it is assumed that the base station allocates the UL resource for use in SPS and/or grant-free transmission or semi-persistent CSI reporting to the UE.

At this time, where the UE performs transmission over multiple scheduling units, the corresponding configuration may be regarded as semi-static SFI which may not be changed by dynamic scheduling or dynamic SFI.

Fifth Embodiment

Further, as described above, CSI transmission may require a reference signal for CSI measurement, UL resource for CSI report transmission (i.e., CSI reporting), and link information about what reference signal of information is to be transferred in the UL resource.

Thus, only when the UL resource for CSI reporting of a certain CSI report occasion and reference signal linked thereto both are valid, the UE may perform CSI transmission.

At this time, where either or both of the UL resource and the reference signal linked thereto are invalid, the following methods may be considered.

First described is a case where at the CSI report occasion, the UL resource for CSI reporting is valid but the reference signal linked thereto is invalid. In this case, the UE may be configured to re-transmit the CSI report previously transmitted or not to transmit the CSI report. In particular, where the UE fails to receive the SFI so that the reference signal is invalid, the UE may be configured to retransmit the CSI report which has previously been transmitted.

At this time, where the reference signal linked to the UL resource for CSI reporting is invalid, the UE may be configured to use the available reference signal most associated or positioned adjacent.

Where neither the UL resource for CSI reporting at the CSI report occasion nor the reference signal linked thereto is valid, the UE may refrain from transmitting the CSI report. That is, in this case, the UE may not perform CSI reporting to the base station.

Where the UL resource for CSI reporting at the CSI report occasion is invalid but the reference signal linked thereto is valid, the UE may refrain from transmitting the CSI report. That is, in this case, the UE may not perform CSI reporting to the base station.

Figure 11:
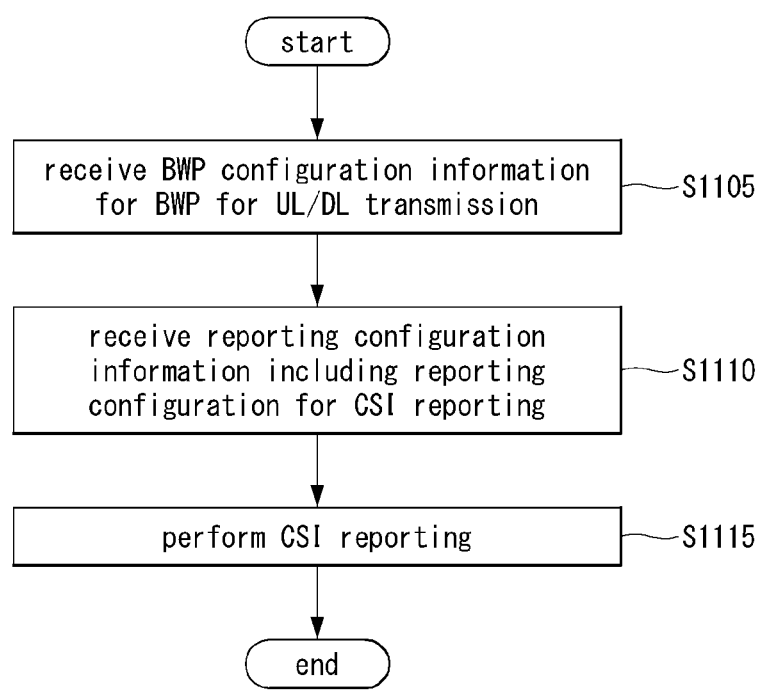
FIG. 11 is a flowchart illustrating operations of a UE performing channel state information (CSI) reporting in a wireless communication system to which a method proposed herein is applicable.

FIG. 11 is a flowchart illustrating operations of a UE performing channel state information (CSI) reporting in a wireless communication system to which a method proposed herein is applicable. FIG. 11 is intended merely for illustration purposes but not for limiting the scope of the disclosure.

Referring to FIG. 11, it is assumed that the base station and/or UE performs CSI measurement and/or reporting based on the methods described above in connection with the embodiments of the disclosure (in particular, the method according to the third embodiment).

First, the UE may receive BWP configuration information for the bandwidth part (BWP) for UL and/or DL transmission from the base station (S1105). In this case, the BWP configuration information may include configuration of one or more BWPs, and at least one of the one or more BWPs may be set as an active BWP. The BWP configuration information may be configured with the respective identifiers (IDs) of the BWPs.

The UE may receive reporting configuration information including a reporting configuration for CSI reporting from the base station (S1110). Here, the reporting configuration may be referred to as CSI reporting configuration, and there may be included one or more reporting configurations. In this case, each reporting configuration may have a relationship with the resource configuration (e.g., CSI-RS configuration) for CSI measurement and the BWP.

Thereafter, the UE may perform CSI reporting based on the BWP configuration information and reporting configuration information received from the base station (S1115).

At this time, the reporting configuration received from the base station may be associated with the BWP received from the base station in which case whether the reporting configuration is activated may be determined based on whether the BWP is activated. For example, as in method 1-2 described above in connection with the third embodiment, when the BWP is activated/deactivated, its associated UL/DL resource configuration (in particular, the semi-persistent CSI configuration or SPS and/or grant-free PUSCH configuration) may be automatically activated/deactivated. In this case, whether the BWP is activated may be set by dynamic signaling (e.g., DCI) of the base station.

The CSI reporting of FIG. 11 may be CSI reporting configured semi-persistently, i.e., SP-CSI reporting, and CSI reporting may be performed via the PUSCH or PUCCH.

The reporting configuration of FIG. 11 may include resource configuration information (e.g., CSI-RS resource configuration for CSI measurement) related to CSI reporting, and the resource configuration information may include information (e.g., BWP identifier) for the BWP associated therewith.

Figure 13:
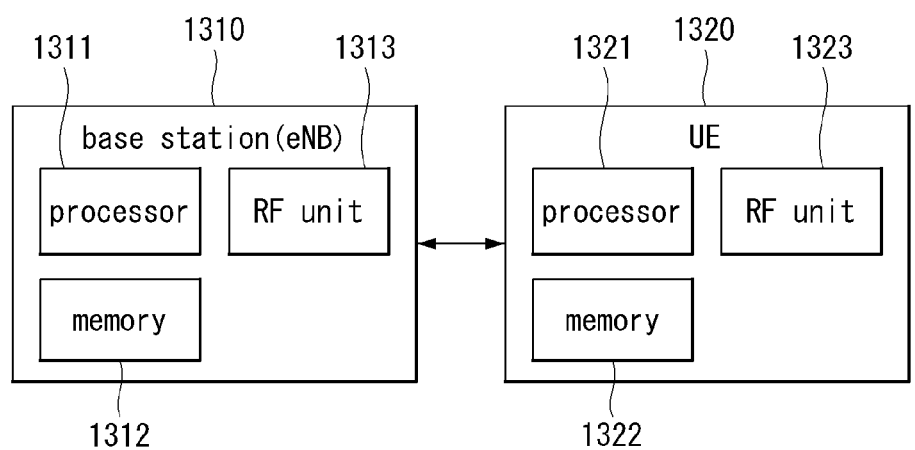
FIG. 13 is a block diagram illustrating a configuration of a wireless communication device to which methods proposed herein are applicable.
Figure 14:
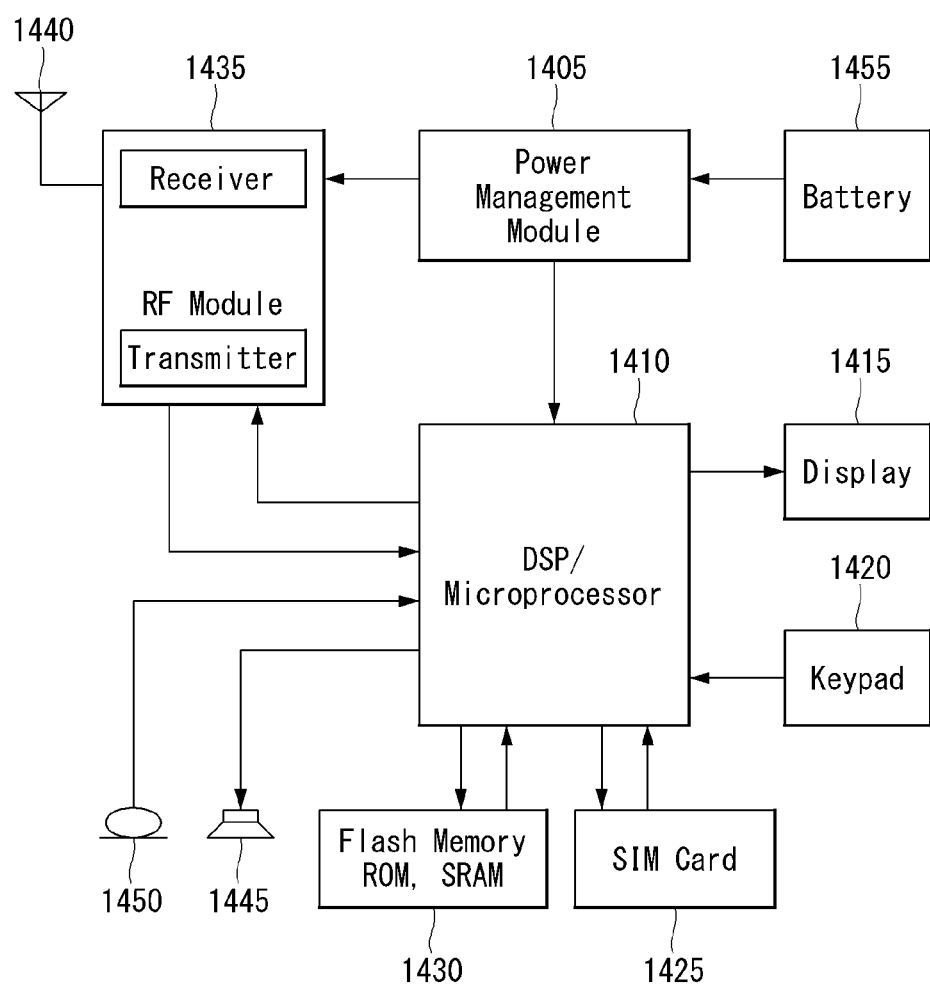
FIG. 14 is a block diagram illustrating a configuration of a communication device according to an embodiment of the disclosure.

In connection, the UE may be configured as a device shown in FIGS. 13 and 14. Given this, the operations of FIG. 11 described above may be performed by the device of FIGS. 13 and 14.

For example, a processor 1321 (and/or a processor 1410) may receive BWP configuration information for the bandwidth part (BWP) for UL and/or DL transmission from the base station (S1105). The processor 1321 (and/or the processor 1410) may receive reporting configuration information including a reporting configuration for CSI reporting from the base station (S1110). Further, the processor 1321 (and/or the processor 1410) may perform CSI reporting based on the BWP configuration information and reporting configuration information received from the base station (S1115).

Figure 12:
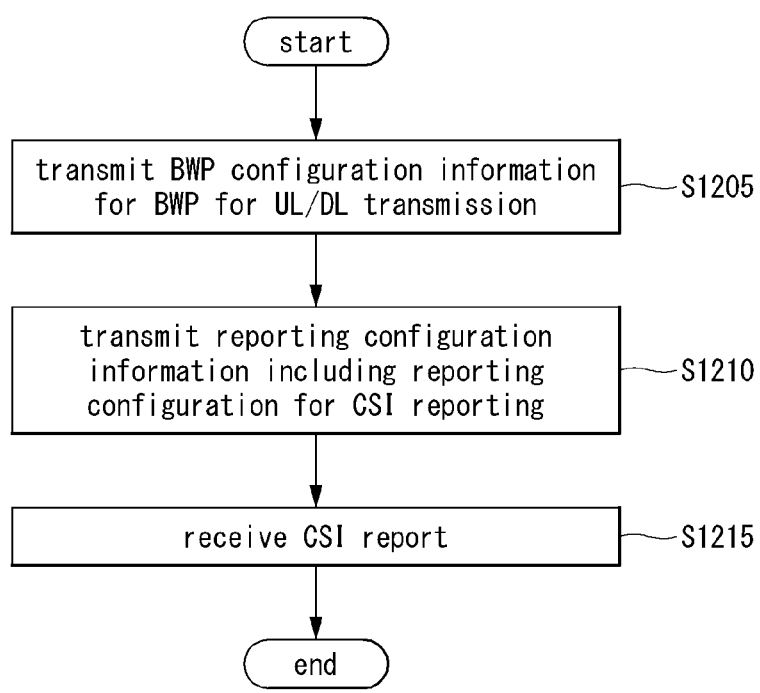
FIG. 12 is a flowchart illustrating operations of a base station receiving channel state information (CSI) reporting in a wireless communication system to which a method proposed herein is applicable.

FIG. 12 is a flowchart illustrating operations of a base station receiving channel state information (CSI) reporting in a wireless communication system to which a method proposed herein is applicable. FIG. 12 is intended merely for illustration purposes but not for limiting the scope of the disclosure.

Referring to FIG. 12, it is assumed that the base station and/or UE performs CSI measurement and/or reporting based on the methods described above in connection with the embodiments of the disclosure (in particular, the method according to the third embodiment).

First, the base station may transmit BWP configuration information for the bandwidth part (BWP) for UL and/or DL transmission to the UE (S1205). In this case, the BWP configuration information may include configuration of one or more BWPs, and at least one of the one or more BWPs may be set as an active BWP. The BWP configuration information may be configured with the respective identifiers (IDs) of the BWPs.

The base station may transmit reporting configuration information including a reporting configuration for CSI reporting to the UE (S1210). Here, the reporting configuration may be referred to as CSI reporting configuration, and there may be included one or more reporting configurations. In this case, each reporting configuration may have a relationship with the resource configuration (e.g., CSI-RS configuration) for CSI measurement and the BWP.

Thereafter, the base station may receive CSI reporting (performed) based on the BWP configuration information and reporting configuration information from the UE (S1215).

At this time, the reporting configuration may be associated with the BWP in which case whether the reporting configuration is activated may be determined based on whether the BWP is activated. For example, as in method 1-2 described above in connection with the third embodiment, when the BWP is activated/deactivated, its associated UL/DL resource configuration (in particular, the semi-persistent CSI configuration or SPS and/or grant-free PUSCH configuration) may be automatically activated/deactivated. In this case, whether the BWP is activated may be set by dynamic signaling (e.g., DCI) of the base station.

The CSI reporting of FIG. 12 may be CSI reporting configured semi-persistently, i.e., SP-CSI reporting, and CSI reporting may be transmitted/received via the PUSCH or PUCCH.

The reporting configuration of FIG. 12 may include resource configuration information (e.g., CSI-RS resource configuration for CSI measurement) related to CSI reporting, and the resource configuration information may include information (e.g., BWP identifier) for the BWP associated therewith.

In connection, the base station may be configured as a device shown in FIG. 13. Given this, the operations of FIG. 12 described above may be performed by the device of FIG. 13.

For example, the processor 1311 may transmit BWP configuration information for the bandwidth part (BWP) for UL and/or DL transmission to the UE (S1205). The processor 1311 may transmit reporting configuration information including a reporting configuration for CSI reporting to the UE (S1210). The processor 1311 may receive CSI reporting (performed) based on the BWP configuration information and reporting configuration information from the UE (S1215).

Where the base station and/or the UE operate as described above in connection with FIGS. 11 and 12, the need for additional signaling to indicate activation/deactivation for the CSI configuration is eliminated, providing advantage in light signaling overhead. Since the UE determines the activation/deactivation of the CSI configuration depending on the activation/deactivation of BWP, the operation complexity of the UE may be lowered.

Overview of Devices to which Present Disclosure is Applicable

FIG. 13 illustrates a block diagram of a wireless communication device to which methods proposed in this specification may be applied.

Referring to FIG. 13, a wireless communication system includes a base station 1310 and multiple UEs 1310 positioned within an area of the base station 1320.

The BS 1310 includes a processor 1311, a memory 1312, and a radio frequency (RF) unit 1313. The processor 1311 implements a function, a process, and/or a method which are proposed in FIGS. 1 to 12 above. Layers of a radio interface protocol may be implemented by the processor 1311. The memory 1312 is connected with the processor 1311 to store various pieces of information for driving the processor 1311. The RF unit 1313 is connected with the processor 1311 to transmit and/or receive a radio signal.

The UE 1320 includes a processor 1321, a memory 1322, and an RF unit 1323.

The processor 1321 implements a function, a process, and/or a method which are proposed in FIGS. 1 to 12 above. Layers of a radio interface protocol may be implemented by the processor 1321. The memory 1322 is connected with the processor 1321 to store various pieces of information for driving the processor 1321. The RF unit 1323 is connected with the processor 1321 to transmit and/or receive a radio signal.

The memories 1312 and 1322 may be positioned inside or outside the processors 1311 and 1321 and connected with the processors 1311 and 1321 by various well-known means.

As an example, in a wireless communication system supporting a low latency service, the UE may include a radio frequency (RF) unit for transmitting and receiving a radio signal and a processor functionally connected with the RF unit in order to transmit and receive downlink (DL) data.

Further, the base station 1310 and/or the UE 1320 may have a single antenna or multiple antennas.

FIG. 14 is a block diagram of a communication device according to an embodiment of the present disclosure.

Particularly, FIG. 14 is a diagram illustrating a UE shown in FIG. 13 in more detail.

Referring to FIG. 14, the UE includes a processor (or digital signal processor (DSP)) 1410, an RF module (or RF unit) 1435, a power management module 1405, an antenna 1440, a battery 1455, a display 1415, a keypad 1420, a memory 1430, a subscriber identification module (SIM) card 1425 (optional), a speaker 1445 and a microphone 1450. The UE may include a single antenna or multiple antennas.

The processor 1410 may be configured to implement the functions, procedures and/or methods proposed by the present disclosure as described in FIGS. 1 to 9. Layers of a wireless interface protocol may be implemented by the processor 1410.

The memory 1430 is connected to the processor 1410 and stores information related to operations of the processor 1410. The memory 1430 may be located inside or outside the processor and may be connected to the processors through various well-known means.

A user enters instructional information, such as a telephone number, for example, by pushing the buttons of a keypad 1420 or by voice activation using the microphone 1450. The processor receives and processes the instructional information to perform the appropriate function, such as to dial the telephone number. Operational data may be retrieved from the SIM card 1425 or the memory 1430 to perform the function. Furthermore, the processor may display the instructional and operational information on the display 1415 for the user's reference and convenience.

The RF module 1435 is connected to the processor and transmits and/or receives an RF signal. The processor forwards instructional information to the RF module, to initiate communication, for example, transmits radio signals comprising voice communication data. The RF module includes a receiver and a transmitter to receive and transmit radio signals. An antenna 1440 facilitates the transmission and reception of radio signals. Upon receiving radio signals, the RF module may forward and convert the signals to baseband frequency for processing by the processor. The processed signals may be transformed into audible or readable information outputted via the speaker 1445.

Figure 15:
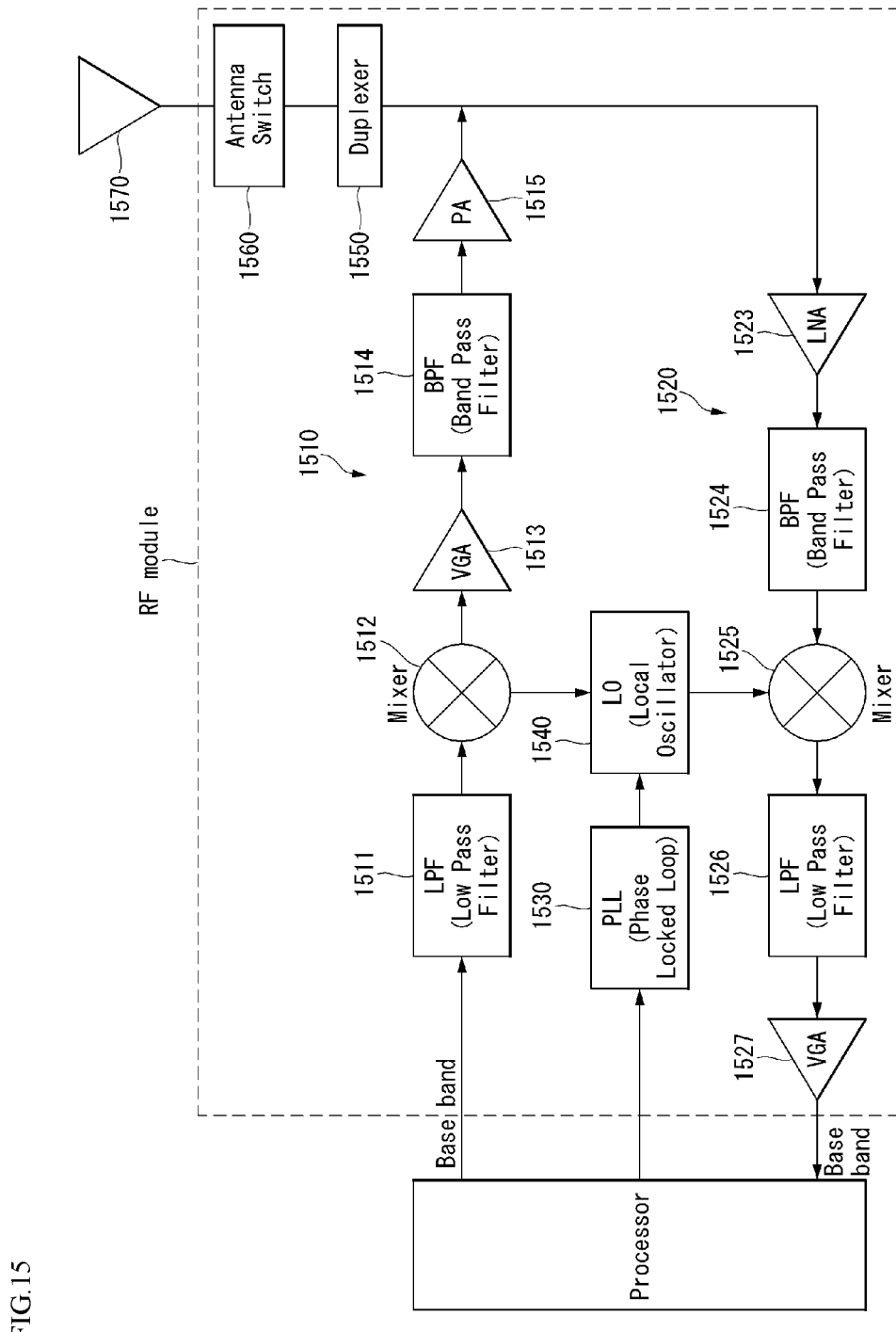
FIG. 15 is a view illustrating an example RF module of a wireless communication device to which a method proposed herein is applicable.

FIG. 15 is a view illustrating an example RF module of a wireless communication device to which a method proposed herein is applicable.

Specifically, FIG. 15 illustrates an example RF module that may be implemented in a frequency division duplex (FDD) system.

First, in a transmission path, the processor described above in connection with FIGS. 13 and 14 processes data to be transmitted and provides an analog output signal to a transmitter 1510.

In the transmitter 1510, the analog output signal is filtered by a low pass filter (LPF) 1511 for removing images caused by digital-to-analog conversion (ADC), up-converted from baseband to RF by an up-converter (e.g., Mixer) 1512, and amplified by a variable gain amplifier (VGA) 1513. The amplified signal is filtered by a filter 1514, further amplified by a power amplifier (PA) 1515, routed via duplexer(s) 1550/antenna switch(es) 1560, and transmitted via an antenna 1570.

In a reception path, the antenna receives signals from the outside and provides the received signals. The signals are routed via the antenna switch(es) 1560/duplexers 1550 and are provided to a receiver 1520.

In the receiver 1520, the received signals are amplified by a low noise amplifier (LNA) 1523, filtered by a band pass filter 1524, and down-converted from RF to baseband by a down-converter (e.g., a mixer) 1525.

The down-converted signals are filtered by a low pass filter (LPF) 1526 and amplified by a VGA 1527 so that an analog input signal is obtained. The obtained analog input signal is provided to the processor described above in connection with FIGS. 13 and 14.

A local oscillator (LO) generator 1540 generates transmission and reception LO signals and provides them to the up-converter 1512 and the down-converter 1525, respectively.

A phase locked loop (PLL) 1530 receives control signals from the processor to generate transmission and reception LO signals at proper frequencies and provide the control signals to the LO generator 1540.

The circuits shown in FIG. 15 may have a different arrangement than that shown in FIG. 15.

FIG. 16 is a view illustrating another example RF module of a wireless communication device to which a method proposed herein is applicable.

Specifically, FIG. 16 illustrates an example RF module that may be implemented in a time division duplex (TDD) system.

In the TDD system, the transceiver 1610 and receiver 1620 of the RF module are identical in structure to the transceiver and receiver of the RF module in the FDD system.

The following description of the RF module of the TDD system focuses primarily on differences from the RF module of the FDD system, and the description in connection with FIG. 15 may apply to the same structure.

The signal amplified by the power amplifier (PA) 1615 of the transmitter is routed via the band select switch 1650, the band pass filter (BPF) 1660, and antenna switch(es) 1670 and is transmitted via the antenna 1680.

In a reception path, the antenna receives signals from the outside and provides the received signals. The signals are routed via the antenna switch(es) 1670, band pass filter 1660, and band select switch 1650 and are provided to the receiver 1620.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

Although the scheme of transmitting/receiving channel state information in the wireless communication system according to the disclosure has been described in connection with examples in which it applies to 5G systems (new RAT systems), the scheme is also applicable to other various wireless communication systems.

What is claimed is:

1. A method of performing channel state information (CSI) reporting by a user equipment (UE) in a wireless communication system, the method comprising:
   receiving, from a base station, bandwidth part (BWP) configuration information for one or more BWPs related to at least one of uplink transmission or downlink transmission;
   receiving, from the base station, one or more reporting configurations for the CSI reporting; and
   performing the CSI reporting based on the BWP configuration information and the one or more reporting configurations,
   wherein, based on (i) each of the one or more reporting configurations including a BWP index related to one of the one or more BWPs, (ii) a specific reporting configuration, among the one or more reporting configurations, being activated, (iii) the activation of the specific reporting configuration being performed separately from an activation related to one of the one or more BWPs, and (iv) a BWP index of the specific reporting configuration being related to an activated BWP among the one or more BWPs:
   the CSI reporting is performed.

2. The method of claim 1, wherein the activation of the specific reporting configuration is performed based on a bit value of a specific field of downlink control information (DCI) related to triggering of the CSI reporting.

3. The method of claim 1, wherein the activation related to one of the one or more BWPs is performed based on (i) a specific signaling or (ii) a pre-configured timer.

4. The method of claim 1, wherein, based on that the specific reporting configuration is related to a semi-persistent CSI reporting, the CSI reporting is performed through a physical uplink shared channel.

5. The method of claim 1, wherein, based on the BWP index of the specific reporting configuration being related to a deactivated BWP among the one or more BWPs, the CSI reporting is not performed.

6. A method of receiving channel state information (CSI) by a base station in a wireless communication system, the method comprising:
   transmitting, to a user equipment (UE), bandwidth part (BWP) configuration information for one or more BWPs related to at least one of uplink transmission or downlink transmission;
   transmitting, to the UE, one or more reporting configurations for the CSI reporting,
   receiving, from the UE, the CSI reporting based on the BWP configuration information and the one or more reporting configurations,
   wherein, based on (i) each of the one or more reporting configurations including a BWP index related to one of the one or more BWPs, (ii) a specific reporting configuration, among the one or more reporting configurations, being activated, (iii) the activation of the specific reporting configuration being performed separately from an activation related to one of the one or more BWPs, and (iv) a BWP index of the specific reporting configuration being related to an activated BWP among the one or more BWPs:
   the CSI reporting is performed.

7. The method of claim 6, wherein the activation of the specific reporting configuration is performed based on a bit value of a specific field of downlink control information (DCI) related to triggering of the CSI reporting.

8. The method of claim 6, wherein the activation related to one of the one or more BWPs is performed based on (i) a specific signaling or (ii) a pre-configured timer.

9. The method of claim 6, wherein, based on that the specific reporting configuration is related to a semi-persistent CSI reporting, the CSI reporting is performed through a physical uplink shared channel.

10. The method of claim 6, wherein, based on the BWP index of the specific reporting configuration being related to a deactivated BWP among the one or more BWPs, the CSI reporting is not performed.

11. At least one non-transitory computer-readable media storing instructions that, when executed by at least one processor, perform operations comprising:
   receiving, from a base station, bandwidth part (BWP) configuration information for one or more BWPs related to at least one of uplink transmission or downlink transmission;
   receiving, from the base station, one or more reporting configurations for the CSI reporting; and performing the CSI reporting based on the BWP configuration information and the one or more reporting configurations, wherein, based on (i) each of the one or more reporting configurations including a BWP index related to one of the one or more BWPs, (ii) a specific reporting configuration, among the one or more reporting configurations, being activated, (iii) the activation of the specific reporting configuration being performed separately from an activation related to one of the one or more BWPs, and (iv) a BWP index of the specific reporting configuration being related to an activated BWP among the one or more BWPs:

the CSI reporting is performed.

12. The at least one non-transitory computer-readable media of claim 11, wherein the activation of the specific reporting configuration is performed based on a bit value of a specific field of downlink control information (DCI) related to triggering of the CSI reporting.

13. The at least one non-transitory computer-readable media of claim 11, wherein the activation related to one of the one or more BWPs is performed based on (i) a specific signaling or (ii) a pre-configured timer.

14. The at least one non-transitory computer-readable media of claim 11, wherein, based on that the specific reporting configuration is related to a semi-persistent CSI reporting, the CSI reporting is performed through a physical uplink shared channel.

15. The at least one non-transitory computer-readable media of claim 11, wherein, based on the BWP index of the specific reporting configuration being related to a deactivated BWP among the one or more BWPs, the CSI reporting is not performed.

* * * * *